US012392302B2

(12) United States Patent
Eliyahu

(10) Patent No.: US 12,392,302 B2
(45) Date of Patent: Aug. 19, 2025

(54) THERMAL OSCILLATION SYSTEMS

(71) Applicant: EXENCY LTD., Moshav Shahar (IL)

(72) Inventor: Nitzan Eliyahu, Moshav Shahar (IL)

(73) Assignee: EXENCY LTD., Moshav Shahar (IL)

( * ) Notice: Subject to any disclaimer, the term of this patent is extended or adjusted under 35 U.S.C. 154(b) by 0 days.

(21) Appl. No.: 18/708,219

(22) PCT Filed: Nov. 10, 2022

(86) PCT No.: PCT/IL2022/051202
§ 371 (c)(1),
(2) Date: May 8, 2024

(87) PCT Pub. No.: WO2023/084520
PCT Pub. Date: May 19, 2023

(65) Prior Publication Data

US 2024/0426259 A1 Dec. 26, 2024

(30) Foreign Application Priority Data

Nov. 10, 2021 (GB) ...................................... 2116171

(51) Int. Cl.
*F02G 1/04* (2006.01)
*F01K 3/26* (2006.01)
(Continued)

(52) U.S. Cl.
CPC ................ *F02G 1/04* (2013.01); *F01K 3/262* (2013.01); *F01K 13/00* (2013.01); *F28D 15/02* (2013.01); *F02G 2256/00* (2013.01)

(58) Field of Classification Search
CPC ........ F02G 1/04; F02G 2256/00; F01K 3/262; F01K 13/00; F01K 7/44; F01K 25/08;
(Continued)

(56) References Cited

U.S. PATENT DOCUMENTS 3,788,064 A 1/1974 Hawkins
4,107,944 A * 8/1978 Eskeli ........................ F25B 9/06
62/401
(Continued)

OTHER PUBLICATIONS

Bachhuber C. "Energy from the evaporation of water" American Journal of Physics. Mar. 1983;51(3)259-64.
(Continued)

*Primary Examiner* — Hoang M Nguyen
(74) *Attorney, Agent, or Firm* — Mark S. Cohen; PEARL ZEDEK LATZER BARATZ LLP

(57) ABSTRACT

A method and system for modulating vapor and liquid fractions of a cycling liquid-vapor fluid operating within its phase transition envelope by creating forced oscillating heat transfer between liquid and vapor fractions of the cycling stream. A liquid stream segment is expansion cooled and brought into thermal communication with a vapor stream segment. The contact with the expansion-cooled liquid enables intermolecular forces to drive condensation and release condensation heat at a condensation temperature higher than the temperature of the expansion-cooled stream segment. The resulting temperature gradient enables the expansion-cooled segment held at constant volume to capture the condensation heat and isochorically vaporize into a vapor stream segment that again is forced to condense so as to form an oscillating thermal cycle within the cycling liquid-vapor fluid.

22 Claims, 23 Drawing Sheets

(51) Int. Cl.
*F01K 13/00* (2006.01)
*F28D 15/02* (2006.01)

(58) Field of Classification Search
CPC ...... F28D 15/02; F28D 7/103; F28D 15/0233; F28D 20/0034; F28F 13/003
See application file for complete search history.

(56) References Cited

U.S. PATENT DOCUMENTS

| | | | | |
|---|---|---|---|---|
| 4,604,867 | A | 8/1986 | Kalina | |
| 5,040,373 | A | 8/1991 | Minovitch | |
| 5,249,436 | A | 10/1993 | Hemsath | |
| 6,185,956 | B1 | 2/2001 | Brasz | |
| 8,141,381 | B2 * | 3/2012 | Ino | F25B 31/008 62/402 |
| 2010/0251757 | A1 * | 10/2010 | Hasegawa | F01C 11/004 62/468 |
| 2011/0271676 | A1 | 11/2011 | Walpita et al. | |
| 2019/0093521 | A1 * | 3/2019 | Briola | F01K 23/067 |
| 2019/0331006 | A1 * | 10/2019 | Eliyahu | F01K 25/06 |

OTHER PUBLICATIONS

International Search Report for PCT Applicaiton No. PCT/IL2022/051202 dated Mar. 15, 2023.
Lay Je. "Thermodynamics: A macroscopic-microscopic treatment" (No Title). 1963; pp. 147-153.
Murrow, Richard B. "A simple heat engine of possible utility in primitive environments" (1966).

* cited by examiner

THERMAL OSCILLATION SYSTEMS

CROSS-REFERENCE TO RELATED APPLICATIONS

This application is a National Phase Application of PCT International Application No. PCT/IL2022/051202, International Filing Date Nov. 10, 2022, claiming the benefit of British Patent Application No. GB 2116171.6, filed Nov. 10, 2021, which is incorporated herein by reference.

BACKGROUND OF THE INVENTION

The present invention relates generally to the field of thermal oscillation systems, and in particular, thermal oscillation in a cycling liquid-vapor stream.

Engineers and scientists have recognized for hundreds of years that ambient thermal energy of sun-heated environments contain unlimited amounts of free thermal energy. Unfortunately, all commercial and practical prior attempts to harness this natural heat energy and convert it into useful mechanical work with high power densities through closed cycle condensing heat engines utilizing the natural environment as its high temperature heat source have failed.

Closed-cycle, condensing-heat-engines operate above ambient temperature because there is no natural heat sink below ambient temperature to absorb the latent heat of vaporization to re-liquefy the vapor discharged from the work generating by expansion device. Hence, closed-cycle condensing heat engines must operate above ambient temperature in which a high temperature heat is maintained through expensive and environmentally harmful fuel combustion. The use of 'high quality' heat of a high temperature and the necessity for expulsion of 'lower quality' heat of a lower temperature reduces work extraction efficiency.

The toy "drinking bird", U.S. Pat. No. 2,402,463A, found in most novelty shops is a closed cycle condensing heat engine that uses the ambient environment as its high temperature heat source and generates a low temperature heat sink by evaporating water.

In a technical report issued by the Rand Corporation in August 1966, entitled "A Simple Heat Engine of Possible Utility in Primitive Environments", Rand Corporation Publication No. P-3367, Richard Murrow proposed constructing larger versions of this engine for pumping water from the Nile river. A scaled-up model of the basic drinking bird engine was constructed at a height of seven feet (2.13 metres) and was able to extract a considerable amount of natural heat energy from the ambient environment and convert it directly into mechanical work. The engine would be capable of extracting an unlimited amount of natural heat energy and convert it into an unlimited amount of mechanical work as discussed in "The Research Frontier—Where is Science Taking Us" Saturday Review, Vol. 50, Jun. 3, 1967, pp. 51-55, by Richard Murrow.

Obviously, such engines that convert the natural heat energy of the environment at ambient temperature into mechanical work are not "perpetual motion machines" because they rely on a constant input of energy. These engines demonstrate that it is indeed possible to extract natural heat energy from the environment at ambient temperature and convert a portion of it into mechanical work by creating an artificial, low temperature heat sink below ambient temperature.

The shortcoming of these ambient operative engines is that they are impractical because they have very low power densities.

Therefore, there is a need for a system that can capture ambient environmental heat and efficiently provide power densities sufficient for work extraction.

SUMMARY OF THE INVENTION

According to the teachings of the present invention, there is provided a method of heat management within a cycling liquid-vapor stream, the method including isobarically releasing condensation heat from vapor of the cycling liquid-vapor stream so as to produce condensate at a first temperature and a first pressure: concurrently cooling condensate of the liquid-vapor stream into an condensate having a second temperature less than the first temperature and a second pressure less than the first pressure, the cooling implemented as adiabatic cooling or isenthalpic cooling; and isochorically vaporizing the condensate with heat.

According to a further feature of the present invention, the cooling is implemented as expansion cooling.

According to a further feature of the present invention, the heat is the condensation heat.

According to a further feature of the present invention, there is also provided, driving an external heat engine with the condensation heat and using the condensate as a heat sink for the external heat engine.

According to a further feature of the present invention, there is also provided, heating a boiler of a distillation unit with the condensation heat and isochorically heating the expansion-cooled condensate with heat generated in condensation forming a distillate.

According to a further feature of the present invention, there is also provided, receiving external heat in the expansion-cooled condensate from a cooling space or from an ambient environment, the external heat supplementing vaporization of the expansion-cooled condensate.

According to a further feature of the present invention, there is also provided, ejecting a portion of the condensation heat to a heating space or an ambient environment.

According to a further feature of the present invention, there is also provided, extracting work from a portion of the combined oscillation-work stream.

According to a further feature of the present invention, the cooling condensate is implemented as flash expansion into an isochoric pump.

According to a further feature of the present invention, the isochorically vaporizing is implemented in the isochoric pump.

According to a further feature of the present invention, the heat is the condensation heat captured in one or more non-circulating stream segments of the cycling liquid-vapor stream.

According to a further feature of the present invention, the heat includes heat captured from an external heat source.

There is also provided according to the teachings of the present invention, a thermal oscillator for managing heat content within a cycling liquid-vapor stream, the oscillator including: a condenser having a plurality of isobaric, heat-conductive cooling channels operative to release condensation heat from a vapor component of the cycling liquid-vapor fluid stream so as to form condensate at a first temperature and a first pressure; a condensate expansion arrangement configured to adiabatically or isenthapically cool the condensate to a second temperature less than the first temperature and a second pressure less than the first pressure; and an isochoric heater pump having a plurality of constant-volume heating chambers heated by heat, the heater pump vaporizing the condensate into vapor during conveyance within the pump.

According to a further feature of the present invention, the condensate expansion arrangement is implemented as an expansion valve.

According to a further feature of the present invention, the isochoric heater pump includes a twin-screw drive of counter-rotating interleaved screws.

According to a further feature of the present invention, the condensate expansion arrangement is implemented as the isochoric heater pump.

According to a further feature of the present invention, there is also provided, a work extraction device in thermal communication with the isochoric heater pump.

According to a further feature of the present invention, the heater pump is implemented as an isochoric pump in thermal communication with an external heat exchanger.

According to a further feature of the present invention, there is also provided, heating a boiler of a distillation unit with the condensation heat and isochorically heating the expansion-cooled condensate with heat generated in condensation forming a distillate.

According to a further feature of the present invention, the heat is heat captured from an external heat source.

According to a further feature of the present invention, the heater pump heat receives condensation heat from one or more non-circulating stream segments of the cycling liquid-vapor fluid stream.

According to the teachings of the present invention, there is provided a method of heat management within a cycling liquid-vapor stream, the method including: isobarically releasing condensation heat from vapor of the cycling liquid-vapor stream so as to produce condensate at a first temperature and a first pressure: concurrently expansion cooling condensate of the liquid-vapor stream into an expansion-cooled condensate having a second temperature less than the first temperature and a second pressure less than the first pressure; and isochorically vaporizing the expansion-cooled condensate with the condensation heat.

According to a further feature of the present invention, there is also provided work extraction during the expansion cooling.

According to a further feature of the present invention, there is also provided isobarically heating the expansion-cooled condensate with the condensation heat prior to the isochorically vaporizing.

According to a further feature of the present invention, there is also provided applying compression work to isochorically vaporized expansion-cooled condensate upon completion of the isochorically vaporizing the expansion-cooled condensate.

According to a further feature of the present invention, there is also provided, driving an external heat engine with the condensation heat and using the expansion-cooled condensate as a heat sink for the external heat engine.

According to a further feature of the present invention, there is also provided heating a boiler of a distillation unit with the condensation heat and isochorically heating the expansion-cooled condensate with heat generated in condensation forming a distillate.

According to a further feature of the present invention, there is also provided receiving external heat in the expansion-cooled condensate from a cooling space or from an ambient environment, the external heat supplementing vaporization of the expansion-cooled condensate.

According to a further feature of the present invention, there is also provided ejecting a portion of the condensation heat to a heating space or an ambient environment.

According to a further feature of the present invention, there is also provided isochorically mixing a work liquid-vapor stream with the expansion-cooled condensate to form a combined oscillation-work stream.

According to a further feature of the present invention, there is also provided extracting work from a portion of the combined oscillation-work stream.

According to a further feature of the present invention, there is also provided receiving external heat in the expansion-cooled condensate from an ambient environment.

According to a further feature of the present invention, there is also provided receiving external heat in the expansion-cooled condensate from a cooling space or a waste heat discharge.

According to a further feature of the present invention, there is also provided heating a heating space with a portion of the condensation heat.

There is also provided according to the teachings of the present invention, a thermal oscillator for managing heat content within a cycling liquid-vapor stream, the oscillator including: a condenser having a plurality of isobaric, heat-conductive cooling channels operative to release condensation heat from a vapor component of the cycling liquid-vapor fluid stream so as to form condensate at a first temperature and a first pressure: a condensate expansion arrangement configured to expansion cool the condensate to an expansion-cooled condensate of a second temperature less than the first temperature and a second pressure less than the first pressure; and an isochoric heater pump having a plurality of constant-volume, heating chambers heated by condensation heat from the condenser the heater pump vaporizing the expansion cooled condensate into vapor during conveyance.

According to a further feature of the present invention, the condensate expansion arrangement is implemented as an expansion valve.

According to a further feature of the present invention, the isochoric heater pump includes a twin-screw drive of counter-rotating interleaved screws.

According to a further feature of the present invention, the isochoric heater pump includes a plurality of retractable vanes forming the heating chambers, the vanes biased to follow a surface geometry during vane rotation such that the heating chamber volume is defined by a degree of vane retraction in accordance with the surface geometry.

According to a further feature of the present invention, the condensate expansion arrangement is implemented within the isochoric heater pump.

According to a further feature of the present invention, the isochoric heater pump includes a heat exchanger.

According to a further feature of the present invention, there is also provided a work extraction device in thermal communication with the isochoric heater pump.

According to a further feature of the present invention, the thermal communication is implemented through isochoric mixing of the expansion cooled condensate and a working fluid of a working cycle in each of one or more of the constant-volume chambers.

There is also provided according to the teachings of the present invention, a thermal oscillator for managing heat content within a cycling liquid-vapor stream, the oscillator including: a condenser means for isobarically condensing a vapor component of the cycling liquid-vapor fluid stream so as to form condensate at a first temperature and a first pressure: a condensate expansion arrangement for expansion cooling the condensate to an expansion-cooled condensate of a second temperature less than the first temperature and a second pressure less than the first pressure; and an isochoric heater pump for vaporizing the expansion cooled condensate into vapor during conveyance.

According to a further feature of the present invention, there is also provided a work extraction means for extracting work from the cycling liquid-vapor stream, the work extraction means in thermal communication with the isochoric heater pump.

There is also provided, according to the teachings of the present invention, an isochoric heater/boiler pump including: a heating shell having embedded heat exchange channels and a porous inner surface, the porous inner surface facilitating heat transfer while preserving non-contact between fluids, and a plurality of driven constant-volume, heating chambers in thermal communication with the heat exchange channels so as to isochorically vaporize fluid disposed in the heating chambers by a heat source disposed in the heat channels during conveyance through the heating shell.

BRIEF DESCRIPTION OF THE DRAWINGS

The subject matter regarded as the invention is particularly pointed out and distinctly claimed in the concluding portion of the specification. The invention is best understood in view of the accompanying drawings in which:

Figure 1:
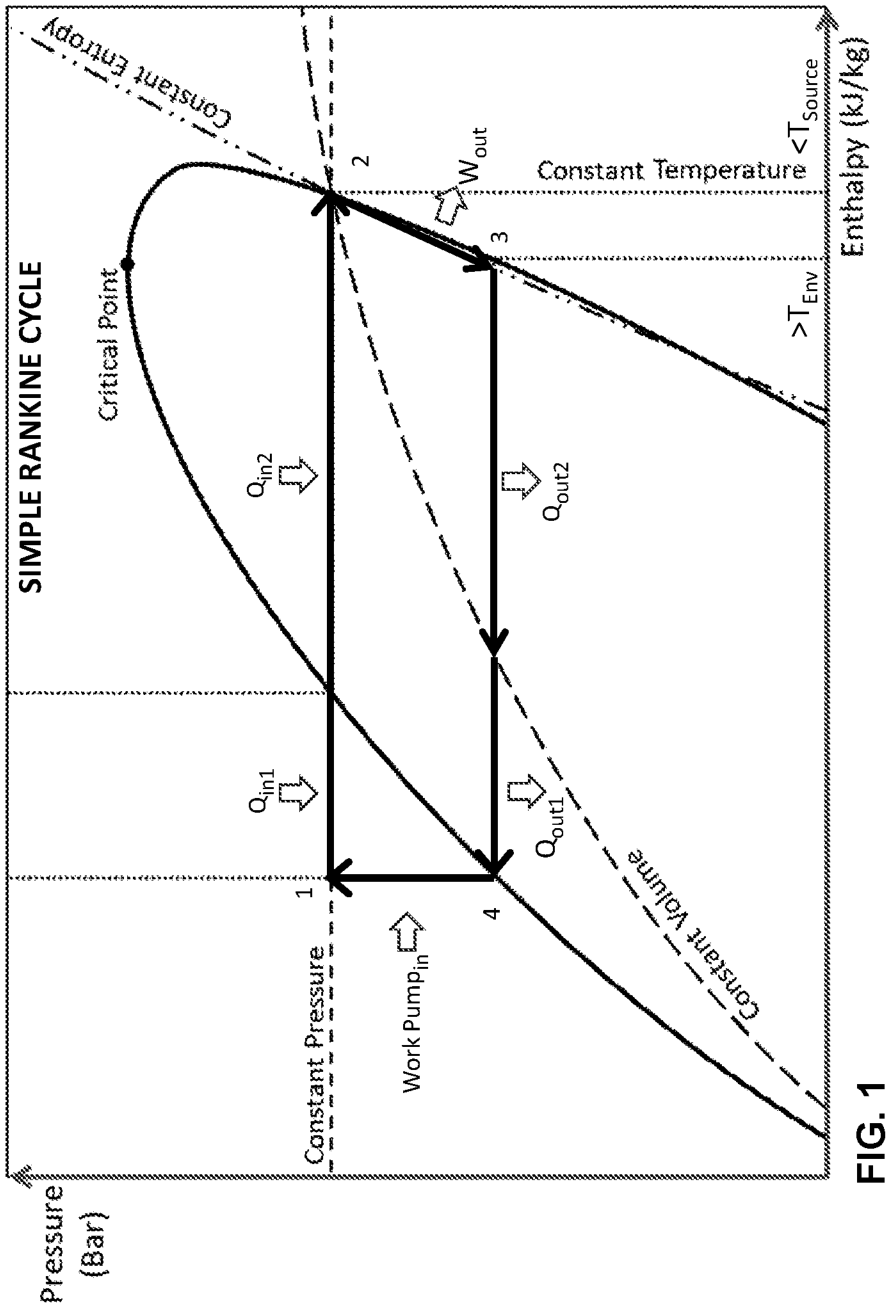
FIG. 1 Prior Art
FIG. 1 depicts a simple Rankine cycle on a pressure-enthalpy (PH) phase diagram for a common refrigerant.

It will be appreciated that for the sake of clarity, elements shown in the figures may not be drawn to scale and reference numerals may be repeated in different figures to indicate corresponding or analogous elements.

DETAILED DESCRIPTION

In the following detailed description, specific details are set forth in order to facilitate understanding of the invention; however, it should be understood by those skilled in the art that the present invention may be practiced without these specific details.

Disclosed is a method and system for thermal management within various energy systems such as solid-vapor systems, solid-gas systems, solid-liquid systems, liquid-liquid systems, gas-gas systems, ionic systems, and cycling vapor-liquid systems. Without diminishing in scope, the current discussion will focus on cycling liquid-vapor systems.

Specifically, thermal energy oscillates between different fluid states within a cycling liquid-vapor stream. A first stream segment is provided at a high temperature relative to a second stream segment. Although the first stream segment is at a relatively high temperature, the temperature is still low enough for the vapor molecules to be subject to intermolecular forces that condense the vapor and release heat of condensation at the high temperature of the first stream segment at isobaric conditions. This high temperature heat is can be used to drive isochoric evaporation of a second segment previously expansion cooled to a temperature less than the high temperature. The second stream segment is rendered into the first stream segment at substantially the first temperature through isochoric evaporation. At this point, the heat of condensation previously released from the vapor of the first stream segment has been captured through evaporation of the second stream segment. This iterative process of heat release and capture between stream segments forms a forced thermal oscillation cycle in which a beginning steady state between the liquid stream segment and the vapor stream segment of the cycling liquid-vapor mixture are continuously forced out of steady state through expansion cooling and subsequent vaporization. The expansion-cooled liquid is in thermal communication with the vapor segment and causes the vapor to condense isobarically and the released condensation heat isochorically evaporates the expansion-cooled liquid. It should be appreciated that heat losses require additional heat input from an external source to maintain the oscillation cycle operating at its original high temperature and additional pumping work to achieve continuous isochoric processing. In certain embodiments, the high temperature of the first stream segment is the ambient temperature of the environment and the lower temperature is sub-ambient and enables spontaneous heat flow from the first stream segment to the second stream segment in compliance with the $2^{nd}$ law of thermodynamics, as will be further discussed.

When linked with a work extraction device, a second cycle is employed as a working cycle that isochorically mixes with the cooled second stream segment and undergoes isochoric heating as a combined oscillation stream segment and a working stream as will be further addressed.

The thermal oscillation stream advantageously adds efficiency to work extraction when linked or combined with a work cycle. The added efficiency is a result of the negation of heat rejection from the oscillation cycle and, accordingly, retains the energy content within the cycling fluid. Furthermore, the oscillation cycle operates at a temperature exploiting intermolecular forces to achieve condensation, thereby negating the need for significant external compression work. The reduction of significant heat input and negation of the significant externally supplied compression work diminish operating costs.

Furthermore, linked oscillation and work cycles enable work extraction at ambient temperature, thereby further saving fuel costs and reducing pollution. It should be appreciated that "high" and "low" refer to the relative operating parameters of the system: condensation occurs at the high end and isochoric vaporization at the low end, as noted above.

In another embodiment, the heat oscillation is implemented with the ambient environment in which condensation heat is rejected into the environment and heat driving isochoric mixing is captured from the environment. The amount of condensation heat rejected and similarly, the amount of environment heat input, are independently configurable in accordance with operational requirements.

FIG. 1 depicts a simple Rankine cycle on a pressure-enthalpy (PH) phase diagram with iso-entropy, iso-temperature, and iso-specific volume lines for a common refrigerant, as known in the art.

As shown, heating a working fluid from state 1 increases enthalpy at constant pressure until complete vaporization at state 2. The resulting working fluid expands in a turbine or other work extraction means from the hot, high pressure fluid at state 2 to state 3. Heat is discharged into a heat sink such as the ambient environment until complete condensation at state 4, and then pumped at substantially constant enthalpy and entropy back to state 1. Since pumping is applied to the fluid as a generally highly incompressible liquid, the amount of work associated with pumping is negligible, thereby rendering the efficiency $\eta_i$ as the ratio of useful work $W_{out}$ to heat energy invested from state points 1 to 2/($Q_{in1}+Q_{in2}$):

$$\eta_1 = W_{out}/(Q_{in1} + Q_{in2}) \quad \text{(Equation 1)}$$

Figure 2:
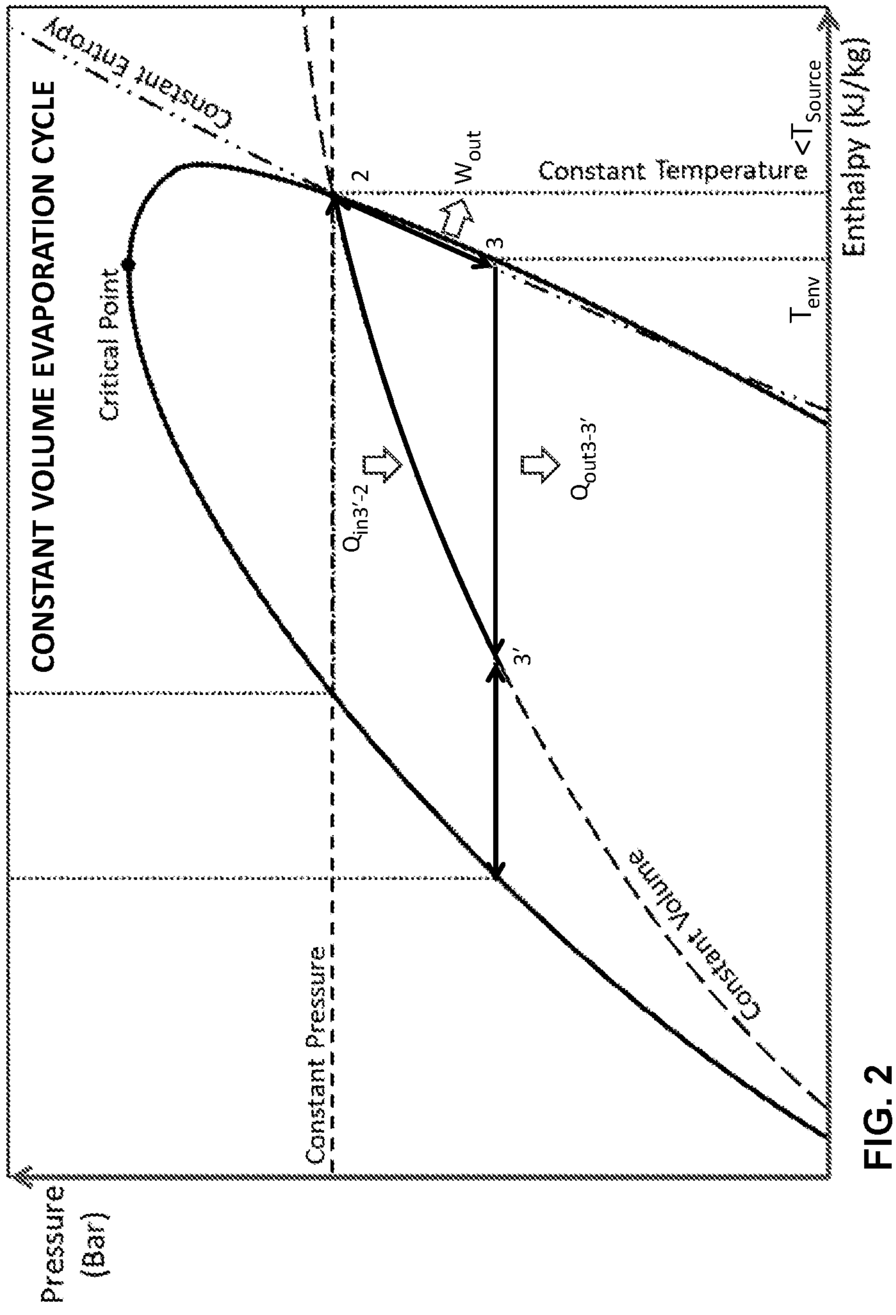
FIG. 2 shows a constant volume evaporation cycle, according to an embodiment.

FIG. 2 shows a constant volume evaporation cycle in which a constant volume of fluid is heated from point 3' to point 2, and work is extracted from 2 to 3 in a turbine or other work extraction means through expansion. Expanded working fluid is condensed from point 3 to 3' through contact with a low-temperature bath to return to point 3'. Accordingly, the efficiency of this cycle is greater than a regular Rankine cycle of FIG. 1 because there is less heat input to produce the same work output $W_{out}$.

Figure 3A:
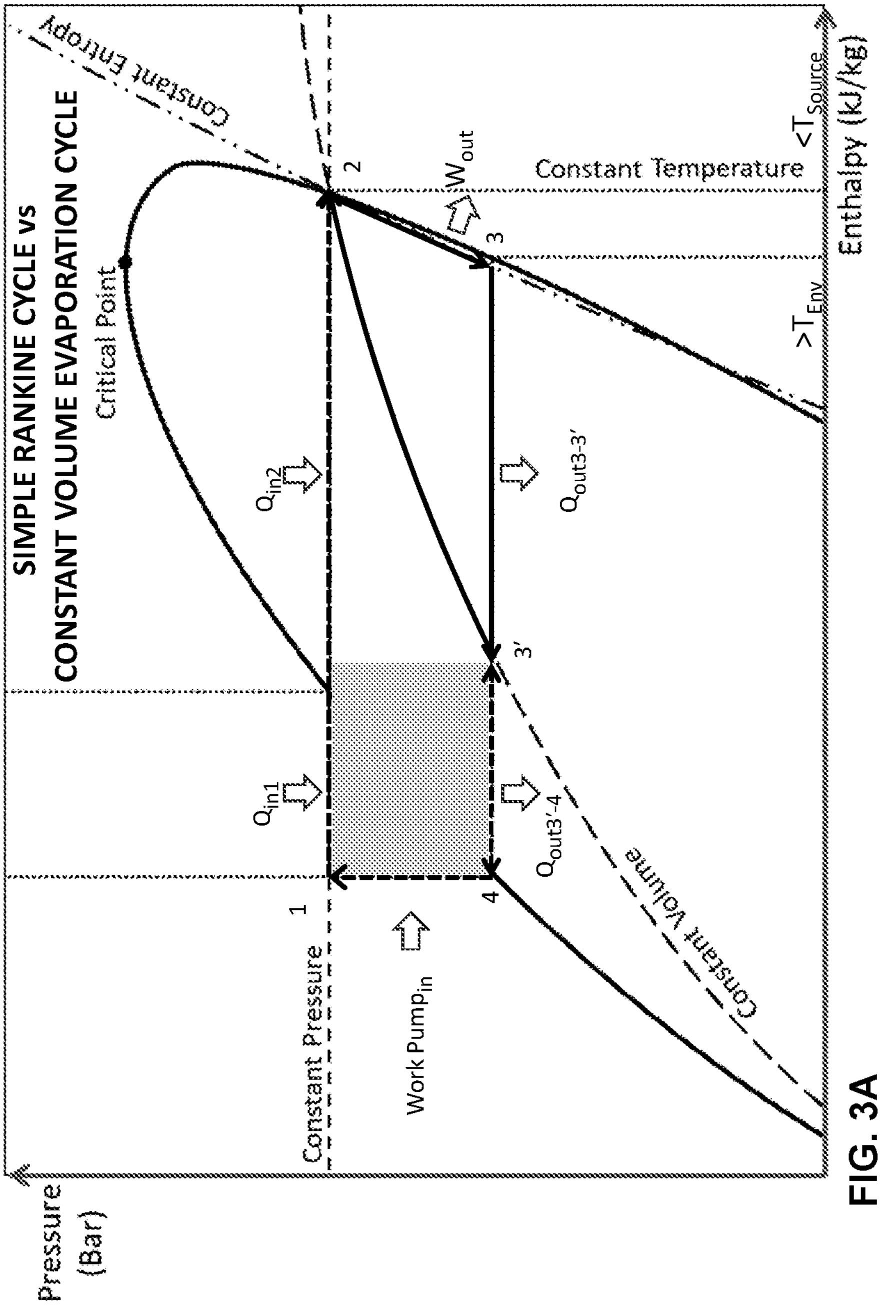
FIG. 3A depicts the Rankine cycle of FIG. 1 overlaid on the constant-volume cycle of FIG. 2 for comparison.

FIG. 3A depicts the Rankine cycle of FIG. 1 overlaid on the constant-volume cycle of FIG. 2 for comparison. The shaded region of the Rankine cycle highlights the 'wasted effort' in the sense that the heat input $Q_{in1}$ does not have any effect on the amount of work produced $W_{out}$.

Figure 3B:
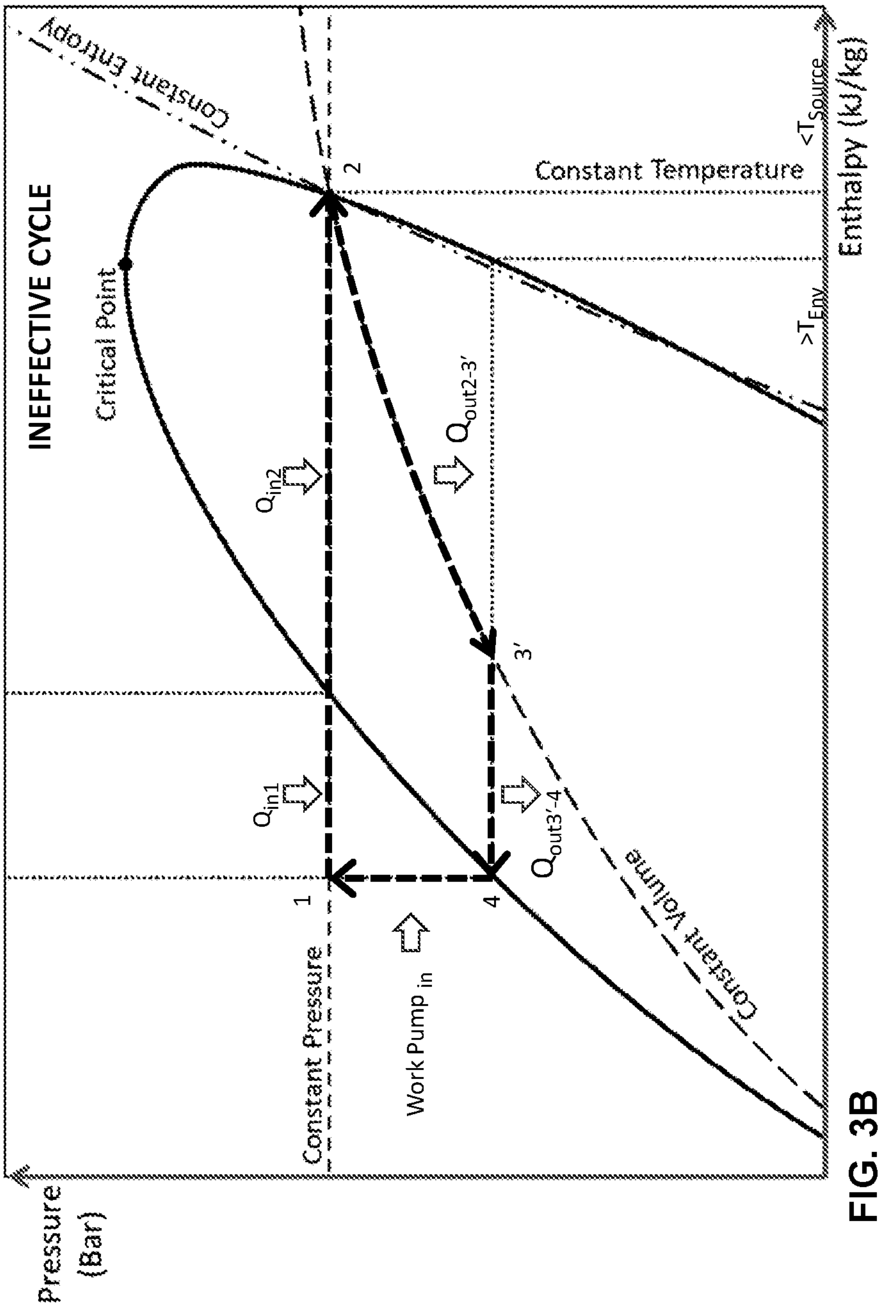
FIG. 3B depicts an ineffective cycle.

FIG. 3B depicts a completely ineffective cycle in which heat is invested at high temperature and rejected at low temperature as implemented in a normal Rankine cycle of FIG. 1. As shown, the decompression and cooling occur along a constant-volume line 3'-2 thereby producing no work since work is the integral of PdV.

Figure 3C:
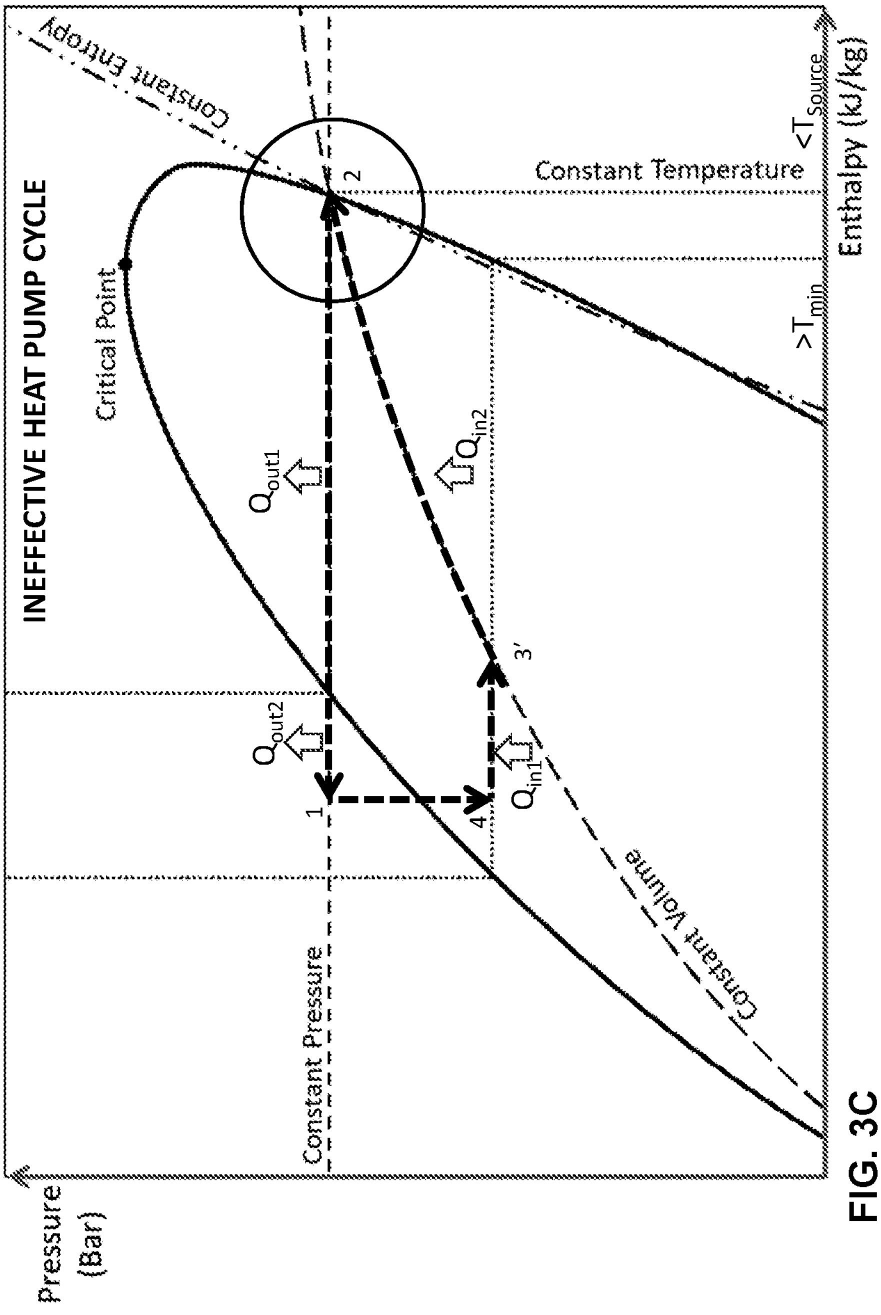
FIG. 3C depicts an ineffective heat pump cycle.

FIG. 3C depicts a cycle where the fluid is decompressed at constant enthalpy from 1-4, then heated from 4-3' at a low temperature, then further heated from 3'-2 along a line of constant volume from external heat $Q_{in2}$. At this point, heat $Q_{out1}$ is rejected at high temperature from 2-1 and the cycle is complete. Essentially, heat is absorbed at low temperature and rejected at high temperature as found in heat pumps like refrigerators or air conditioners. However, to complete the cycle at the hottest temperature at point 2 heat must be supplied to the isochorically evaporating liquid at a temperature higher than the temperature of the heat discharged in isobaric condensation to ensure heat transfer, thereby rendering the cycle ineffective.

Figure 3D:
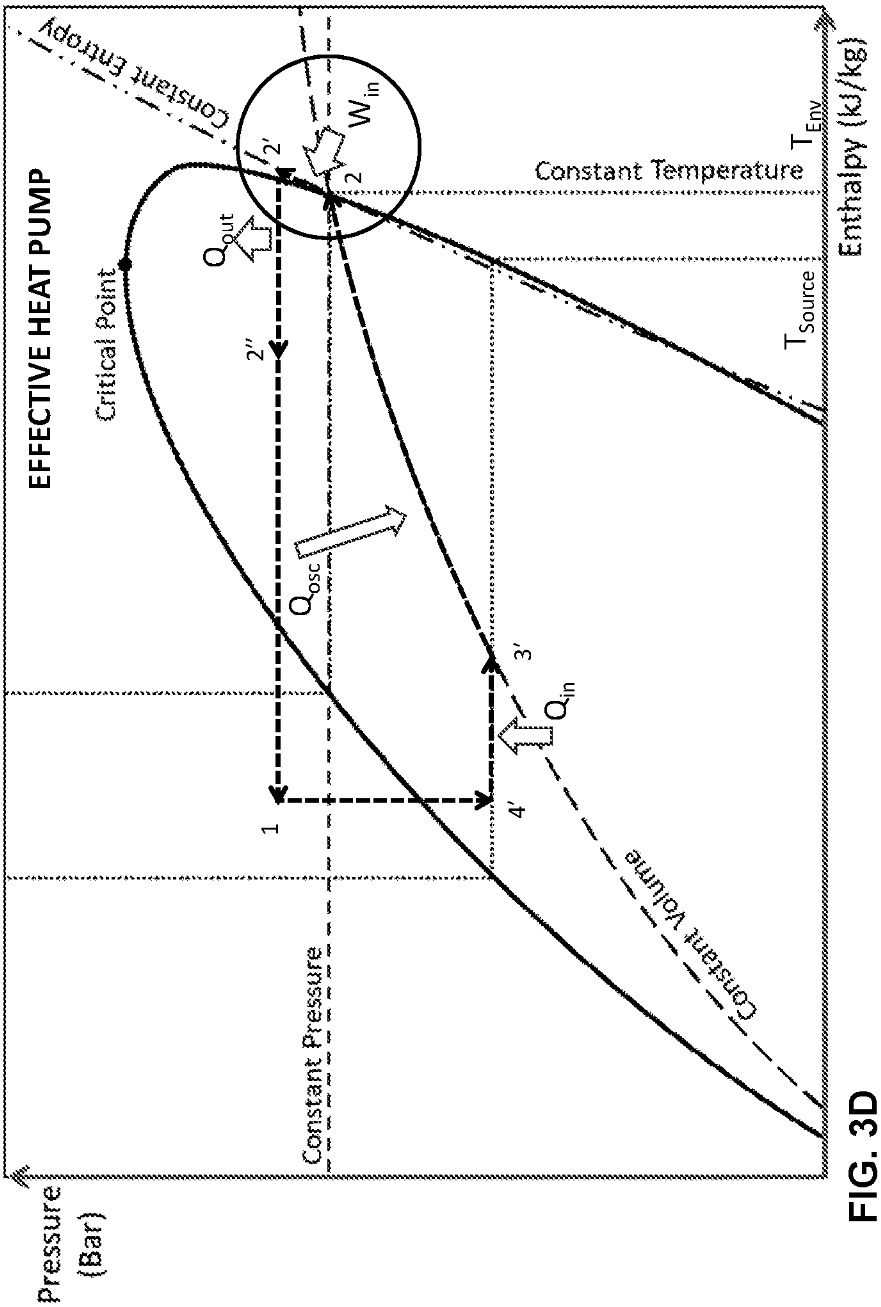
FIG. 3D depicts a work input modification of an ineffective heat pump cycle to an effective heat pump, according to an embodiment.

FIG. 3D depicts an effective heat pump in contrast to that depicted in FIG. 3C. The cycles of FIGS. 3C and 3D are substantially analogous. However, the cycle of FIG. 3D embodies a profound jump in efficiency because the cycle is completed by inputting additional work $W_{in}$, between points 2 and 2' to close the cycle instead of the additional heat employed in the cycle of FIG. 3C. Since this cycle does not rely on high temperature heat to complete the cycle, it can function as an effective heat pump. As shown, external heat $Q_{in}$ is drawn from a cooling space, waste heat discharge, environment and supplements the oscillation heat $Q_{osc}$ released during condensation to heating the expansion cooled condensate between 3' and 2. It should be appreciated that in applications in which the external heat $Q_{in}$ is hotter, it can contribute to the isochoric vaporization. Furthermore, the oscillating heat management system in certain embodiments outs a portion of the condensation heat as heat output to a heating space. It should be appreciated that oscillating heat management system is advantageously configurable to function as a heat pump providing either cooling, heating, or both cooling and heating. Examples of cooling spaces are spaces in which heat is extracted for refrigeration, freezing, or air conditioning. Examples of heating spaces are steam boilers. In implementation, any of the three embodiments to be discussed of an isochoric heater pump can be employed. In certain embodiments, the oscillating heat management system is implemented as a plurality of serially linked units, thereby augmenting the temperature gradient between the input heat and the output heat. In such serial arrangements, the condensation heat released in an upstream unit is used to isochorically vaporize the expansion-cooled condensate of the downstream unit. In certain other embodiments the system is further linked to a work cycle having a work extraction device, as will be discussed.

The heat transfer in the oscillation cycle makes it possible to increase pressure and temperature without significant work investment for compression. One only needs to invest the pump work and therefore the efficiency is significantly higher than that of a heat pump operating in the same temperature range.

Figure 4B:
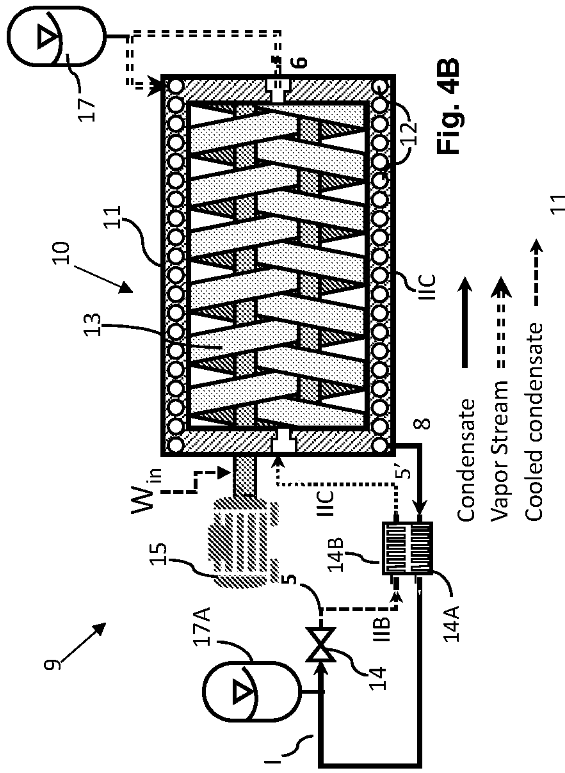
FIG. 4B is a schematic view of a thermal oscillator with cross-sectional side-view of a screw-heater pump implementing the thermal oscillation cycle of FIG. 4A, according to an embodiment.
Figure 4C:
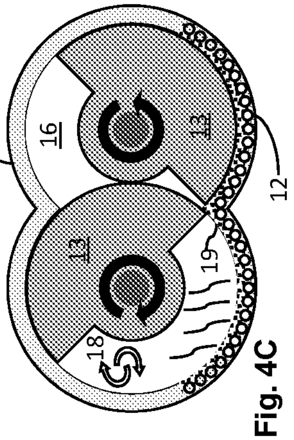
FIG. 4C is a schematic cross-sectional end-view of the screw-heater pump view of FIG. 4B, according to an embodiment.
Figure 4A:
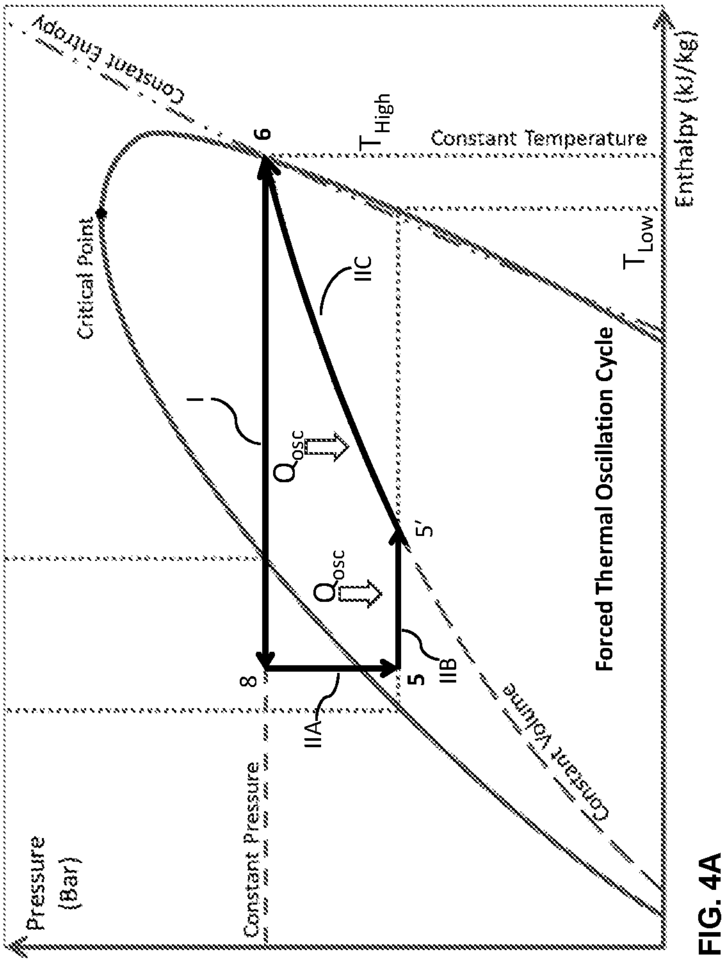
FIG. 4A depicts a forced thermal oscillation cycle on a p-h diagram, according to an embodiment.

FIG. 4A depicts a forced thermal oscillation cycle in which heat is rejected at high temperature and absorbed at low temperature to drive low temperature heating and vaporization in compliance with the second law of thermodynamics. The heat release is implemented through high temperature condensation and concurrent expansion cooling of the condensate in which latent heat energy is released into the resulting vapor. The vaporization causes a temperature drop in the remaining condensate. Since heat of condensation is rejected at the highest temperature of the cycle, $T_{high}$, a temperature gradient between stream segments is created, thereby enabling the high temperature condensate heat to drive low temperature processing, as previously noted.

Specifically, as shown in the thermal oscillation cycle on P-H diagram of FIG. 4A, heat oscillates between the two stream segments I and II of a cycling fluid stream. Stream segment I begins at state 6 as high temperature and pressure at near ambient temperature, in a certain embodiment. Ambient temperature ranges between 15 and 25 degrees Celsius, for example. Stream segment I undergoes constant temperature and pressure condensation and some additional cooling from states 6-8.

During condensation of the first stream segment I, stream segment IIA is expanded from a cooled liquid at state 8 to a liquid-vapor mixture at state 5. The expansion creates a temperature drop of stream segment IIA, as noted above, thereby creating a temperature gradient that drives heat transfer between condensing stream segment I and stream segment IIB and IIC. The condensation and cooling heat $Q_{osc}$ is captured isobarically by stream segment IIB from state 5 to 5' and is heated and then isochorically vaporized from 5' to approach the original temperature and pressure of segment I at state 6. The degree of proximity to the starting state of stream segment I at state 6 is a function of system losses, as is known in the art. The heat oscillation cycle advantageously preserves the heat within cycle 6-8-5-5' thereby reducing heat input required to extract work when linked to a work extraction device or work input when thermally linked to a heat pump, desalination or distillation systems, or other thermal devices, as will be discussed. The expansion of stream segment IIA is implemented isenthalpically in a certain embodiment, and in another embodiment the expansion is implemented isentropically or adiabatically. The oscillator advantageously enables modulation of the vapor fraction and liquid fractions and accordingly can stabilize and establish temperature gradients in linked systems by changing the mass flow rates and the expansion degree.

FIG. 4B depicts an embodiment of thermal oscillator 9 implementing the cycle of FIG. 4A. As shown, thermal oscillator 9 includes an isochoric heat exchanger pump 10 equipped with twin-screws 13, a starter motor 15 for driving screws 13, a vapor accumulator 17 in fluid communication with the fluid output of twin-screw 13 for maintaining constant pressure during condensation and cooling, a liquid accumulator 17A in fluid communication with condensate output from heat exchange channels 12 embedded in exchanger shell 11, and an expansion valve 14 for either isenthalpic or isentropic expansion of stream segment IIA.

FIG. 4C depicts a cross-sectional end view of dual screw drive 13 of isochoric heat exchanger pump 10, according to an embodiment. As shown, twin-screw drive 13 is a set of counter-rotating interleaved screws, one of right-handed helicity and the other of left-handed helicity, that are adapted for pushing a fluid along the screw lengths. The fluid is pushed between constant volume-chambers 16 formed within screws 13 and also provides a high degree of thermal contact between the stream IIC and exchanger housing 11. As shown, exchanger housing 11 has embedded channels 12 and a porous inner surface 19 to maximize heat exchange between segment stream I during condensation/evaporation and cooling while pumped through channels 12 and post expansion cooling segment stream IIC driven through heat exchanger 11 by twin-screw 13 in constant-volume chambers 16.

In operation, oscillator 9 begins with stream segment I and stream segment IIB of one fluid stream at two different thermodynamic states. Segment stream I begins at a high temperature, high pressure vapor as shown a state 6 and segment stream IIA begins at a high temperature, high pressure condensate, as shown at state 8.

As segment I cools in exchanger channels 12, segment IIA undergoes rapid expansion through expansion valve 14. The expansion transforms segment IIA into cooled, two-phase segment IIB. The resulting temperature difference between segment I and segment IIB and IIC of the cycling fluid stream causes the heat of condensation released during cooling of segment I to be captured by stream segments IIB and IIC in heat communications as both streams pass through isochoric heat exchanger 10. Specifically, segment I cools while pumped through channels 12, whereas segment IIC captures the condensations heat while being conveyed in constant-volume chambers 16 of driven screw-drive 13. As segment IIC advances, it captures additional heat and vaporizes and continues to rise in temperature and pressure under the influence of additional heat capture in the constant-volume chambers 16. When the temperature and pressure achieve the starting point 6, segment IIC is rendered into segment I, is either cooled in channels 12 or stored in accumulator 17 for future cooling. The condensate is either expansion cooled through expansion valve 14 or stored in condensate accumulator 17A for future expansion.

The repetitive heat transfer between the two different stream segments of the cycling fluid stream creates a thermal oscillation within the overall cycling stream. The resulting preservation of thermal energy within the cycling fluid stream advantageously reduces the heat input required to extract work from the fluid stream, as will be discussed.

Figure 5A:
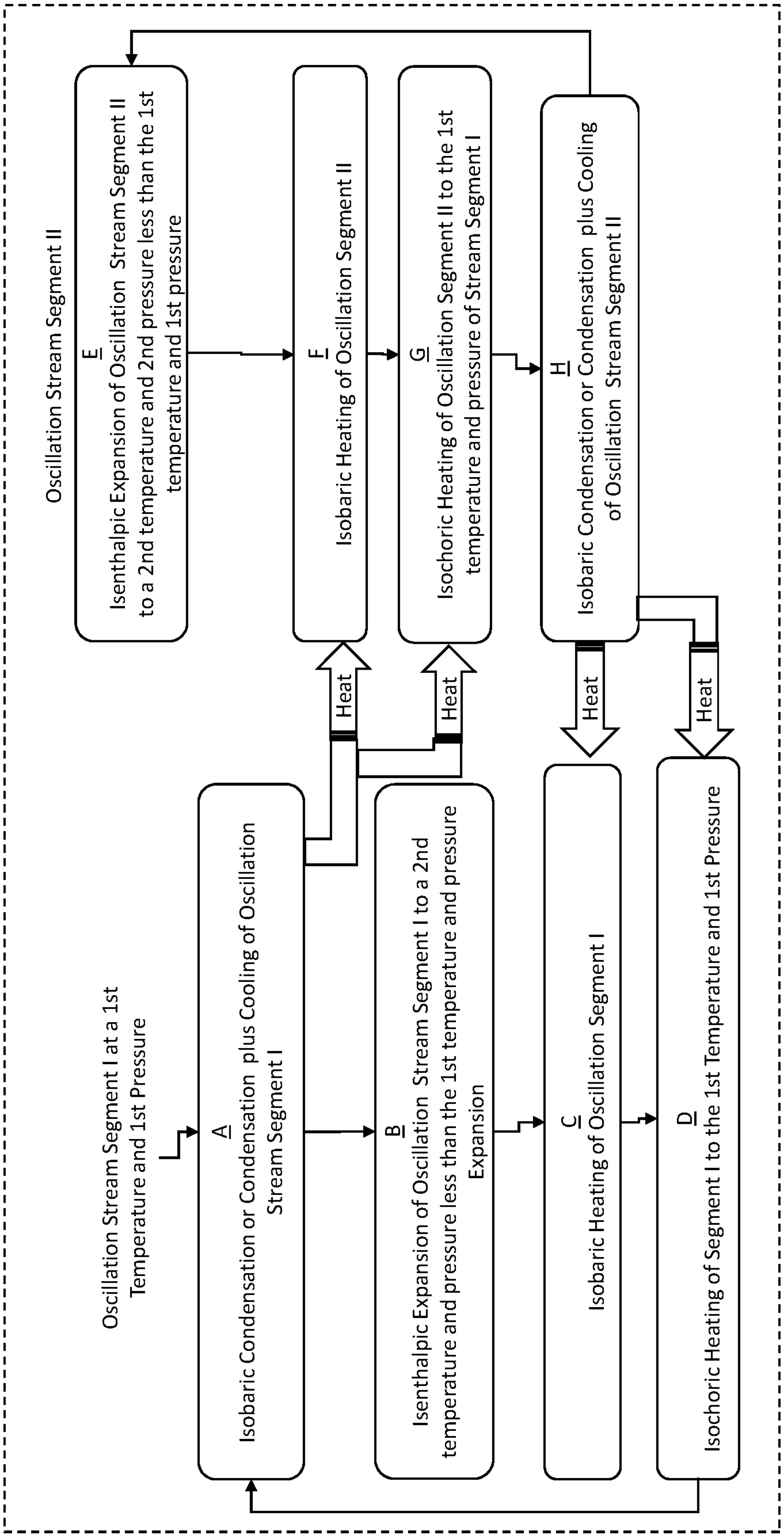
FIG. 5A is a flow chart depicting the processing steps and heat transfer stages in a forced thermal oscillation cycle, according to an embodiment.

FIG. 5A depicts a flow chart of the interaction of two segments I and II of the cycling fluid streams at each of the processing steps of thermal oscillator 9, in view of the cycle of the P-H diagram of FIG. 4A, according to an embodiment.

As shown, the cycling fluid stream is treated as two synchronized cycling stream segments, segment I and segment II. Each stream segment begins at a different thermodynamic state and is synchronized to ensure that high temperature heat released as heat of condensation by one stream segment is captured by the other segment and vice versa, as previously noted. Each reiterative heat transfer between the stream segments necessitates that the heat receiving segment have a temperature less than the temperature of the stream from which the heat is being released, as is known in the art. Specifically, high temperature and pressure stream segment I is isobarically condensed from states 6 to 8 (followed by cooling in certain configurations) in step A. In parallel, stream segment II undergoes rapid expansion from state 8 to 5 in step E and the associated cooling enabling heat transfer from segment I to isobarically heat segment II from state 5 to 5' in step F and then isochorically vaporize segment II at step G. Continuing with segment I, it is cooled from states 8 to 5 through expansion in step B, which also creates the necessary temperature drop to receive heat from the isobaric condensation of segment II in step H. After isobarically heating segment I at step C and then isochorically vaporizing segment II at step D, the cycle continues to step A with isobaric condensation and simultaneous expansion in step E for segment II. It should be appreciated that the isobaric heating of segment I at step C and the analogous isobaric heating of segment II at step F are optional and in certain embodiments isochoric heating is employed in steps D and G in the absence of isobaric heating.

Figure 5B:
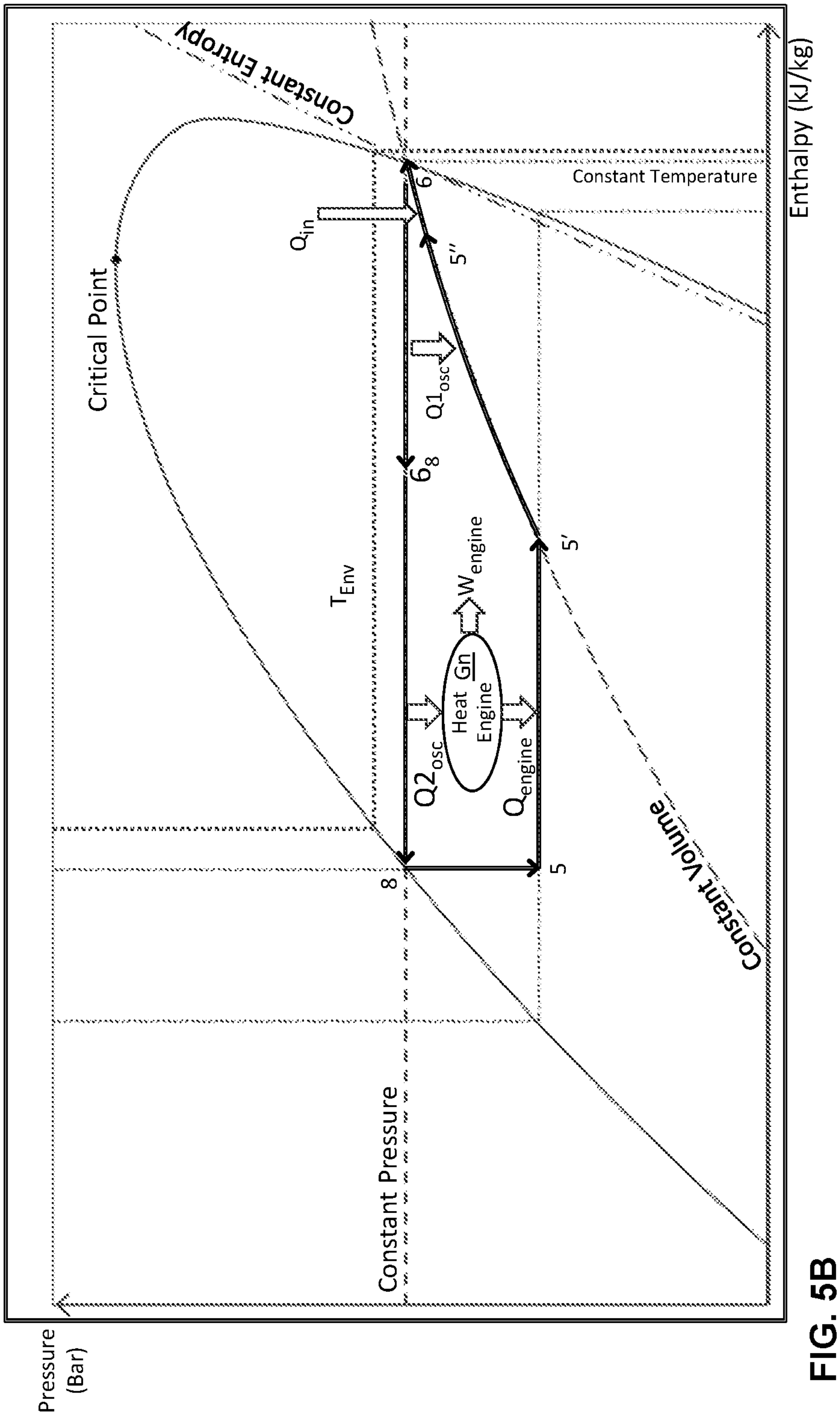
FIG. 5B depicts a forced thermal oscillation cycle on a p-h diagram showing heat transfer in and out plus work output from an external heat engine thermally linked to the oscillation cycle, according to an embodiment.
Figure 9A:
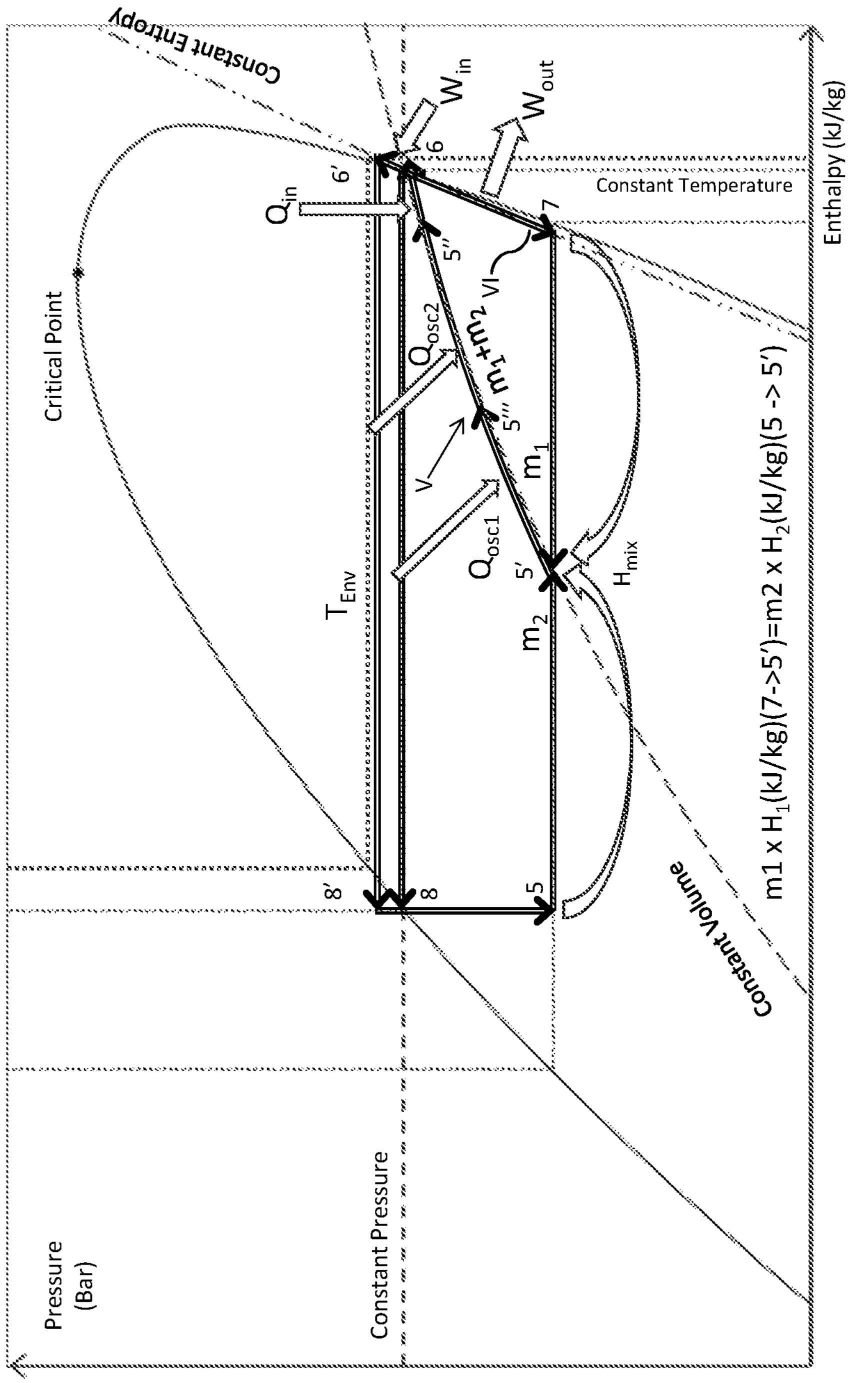
FIG. 9A depicts linked oscillation and work cycles, according to a variant embodiment.

FIG. 5B depicts a forced thermal oscillation cycle thermally linked to external heat engine Gn, such as an organic Rankine cycle engine, a steam engine, a Stirling engine, or other types of heat engines. The oscillation cycle, implemented by the system of FIG. 4B for example, serves both as a heat source and a heat sink for engine Gn. As shown, high temperature condensation heat $Q1_{osc}$ released during isobaric condensation from states 6-68 is captured in isochoric segment 5'-5" of the thermal oscillator cycle and $Q2_{osc}$ released during isobaric condensation from states 68-8 is a heat source that drives engine Gn for work output $W_{engine}$. Ejected low-temperature engine heat $Q_{engine}$ isobarically heats expansion-cooled condensate from states 5-5' in the oscillation cycle, in compliance with the 2nd law of thermodynamics. The capture and exploitation of the ejected, low-temperature engine heat $Q_{engine}$ within the oscillation cycle provides a profound advance in heat engine efficiency in which low-temperature heat is typically considered waste heat and does not contribute to engine work functionality during its next cycle. As shown, the capture of the ejected low-temperature engine heat $Q_{engine}$ advantageously reduces the amount of external heat that needs to be supplied in the next cycle to maintain proper functioning of the oscillation cycle and the consequent work output $W_{engine}$. Variant embodiments apply compression work as shown in FIGS. 3D and 9A to increase the temperature gradient to facilitate transfer of condensation heat for isochoric heating.

Figure 6A:
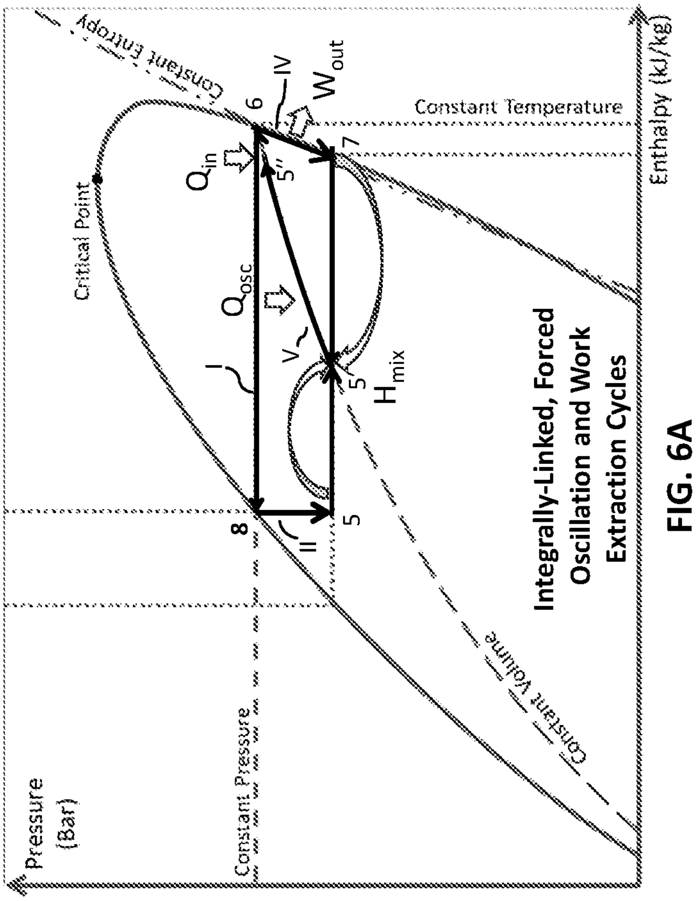
FIG. 6A depicts linked thermal oscillation and work cycles on a p-h diagram; according to an embodiment.

FIG. 6A depicts linked oscillation and work cycles on a P-H diagram, according to an embodiment. As shown, oscillation cycle of fluid stream segments I, II, and V cycles around points 6-8-5-5'-5"-6 and the fluid stream of work cycle around state points 5'-5"-6-7-5'. After expansion cooling at state point 5, stream segment II isochorically mixes with working stream IV after work extraction at point 7 into a single stream V of an average enthalpy of 5' for isochoric heating from states 5'-5"-6. The isochoric heating from 5'-5" highlights heating from captured condensation heat released from condensation of segment I, whereas heating from 5"-6 highlights heating from heat $Q_{in}$ supplied from an external source. The work extraction $W_{out}$ necessitates externally supplied heat $Q_{in}$ to complete isochoric heating of combined oscillation-work stream V to achieve the beginning thermodynamic state of stream segment I of oscillation stream segment 6. After isochoric heating, stream segment V is split into stream segment I for condensation in the oscillation cycle and stream VI for work extraction in the work cycle in accordance with configuration options.

Figure 6B:
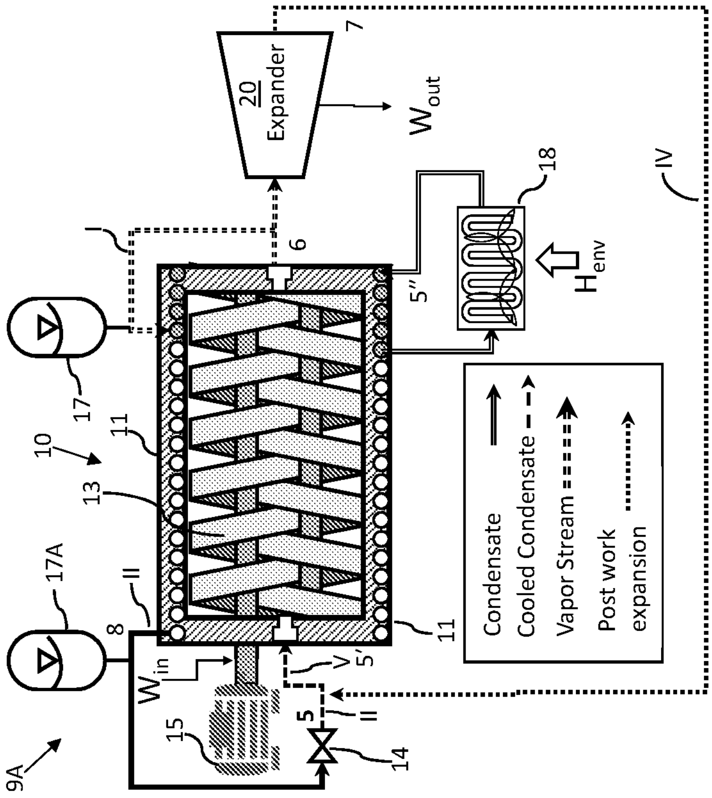
FIG. 6B is a schematic view of a forced thermal oscillator-heat engine system with cross-sectional side-view of a screw-heater pump implementing the linked oscillation and work cycles of FIG. 6A, according to an embodiment.

FIG. 6B depicts an embodiment of a thermal-oscillating work-extractor formed from an integrally linked thermal oscillator and turbine or other work extraction device 20 collectively implementing the cycles of FIG. 6A. In addition to the system depicted in FIG. 4B, the oscillating work extractor 9A includes an expander 20 operative to output work $W_{out}$ by expanding a fraction of high energy stream V and a heat exchanger 18 operative to provide external heat during isochoric heating as shown in the cycle from 5"-6 of FIG. 6A.

In operation, stream segment I condenses during conveyance through channels 12 of isochoric heater pump 10. Concurrently, condensate of oscillation stream segment II undergoes near instantaneous expansion through expansion valve 14 to a temperature significantly less than the temperature of condensing stream I to drive heat flow, as previously noted. Stream segment II isochorically mixes with working stream IV at state 5' to form combined stream V having a weighted average enthalpy of the combined mass of stream II at point 5 and IV at point 7. Combined stream V at point 5' has a temperature of 25-30° C. less than condensate stream I in channels 12, in a certain embodiment. The forced temperature gradient advantageously enables heat oscillation between different segments of the fluid cycle as noted above. In certain other embodiments, the temperature gradient ranges between 20-25° C. or 30-35° C. and in yet another embodiment the temperature gradient ranges between 15-20° C. In embodiments employing serially linked heater pumps, the temperature gradient increases proportionally with the number of each additional heater pump. The combined oscillation-work stream V is driven through isochoric heater pump 10 in constant volume chambers 16 of screws 13 and is vaporized by the heat of condensation upon contact with the augmented contact surface of porous inner surface 19. It should be appreciated that the surface porosity does not traverse the exchanger wall and there is no intermixing of the condensing and vaporizing streams. External heat exchanger 18 supplies external heat $Q_{in}$ to combined stream V through exchanger channels 12 to push the temperature and pressure of oscillator stream segment I, now primarily or completely vapor, to the beginning temperature and pressure at state 6. Heat $Q_{in}$ is supplied through any of a variety of heat sources like environment heat, combustion heat, electrical heat, solar heat, or other heat providing technologies.

After completion of isochoric heating, combined stream is split into two fractions through a control valve (not shown) in accordance with configuration parameters: one fraction becomes stream segment I of the oscillation cycle, whereas the second fraction becomes the work cycle stream IV that undergoes expansion from states 6 to 7 for work extraction.

Both the oscillation stream segment II and working stream IV recombine into isochoric cycle V and repeat the isochoric heating as described.

The linkage of a thermal oscillator to a heat engine system provides a profound improvement in process efficiency $W/Q_{in}$, thereby reducing external heat input to extract useful work.

The following are simulation results for the integrally linked cycles of FIG. 6A given an equal ratio of mass flow of the expander flow $m_1$ and oscillator flow $m_2$ of 1.0 kg/cycle each and a combined pump volumetric flow rate 360 $m^3$/hr.

21. A plurality of extendable vanes 23 are mounted on rotor 22A and biased to maintain contact with the inner wall of housing wall 21. During rotation, vanes 23 extend or retract in accordance with the inner wall surface geometry. As vanes 23 extend, the chamber volume in-between vanes 23 increases and, conversely, as vanes 23 retract chamber volume decrease. As shown, isochoric housing wall 21 includes a highly porous surface 19 to increase surface area for heat transfer and turbulence from boiling and two-phase isochoric heating. Vane heater 10B also includes embedded channels 12 for conveyance of stream segment I during condensation and cooling as noted above.

| Refrig. | $T_{high}$ ° C. | $T_{low}$ ° C. | $P_{high}$ Bar | $P_{low}$ Bar | P Ratio | 5'->6 Density kg/$m^3$ | 5'->6 Pump flow $m^3$/cyc | $H_{8,5}$ kJ/kg | $H_{5'}$ kJ/kg | $H_{5''}$ kJ/kg | $H_6$ kJ/kg | $H_7$ kJ/kg | $Q_{in}$ kJ/cyc | $W_{out}$ MJ/hr | Pump Work kW | Net Work kW |
|---|---|---|---|---|---|---|---|---|---|---|---|---|---|---|---|---|
| R513a | 13 | −4 | 4.9 | 2.7 | 1.81 | 25.0 | 0.08 | 217 | 297 | 383 | 389 | 377 | 12 | 54 | 2.86 | 9.9 |
| R1234yf | 12 | −5 | 4.6 | 2.6 | 1.77 | 25.0 | 0.08 | 215 | 287 | 365 | 370 | 359 | 11 | 50 | 2.86 | 8.8 |
| R152a | 16 | −2 | 4.7 | 2.5 | 1.88 | 14.3 | 0.14 | 229 | 362.5 | 509 | 521 | 496 | 25 | 64 | 2.12 | 13.1 |
| R717 | 15 | −7 | 7.3 | 3.7 | 1.97 | 5.7 | 0.35 | 268 | 822.5 | 1426 | 1474 | 1377 | 97 | 100 | 1.53 | 22.0 |
| R290 | 17 | −3 | 7.8 | 4.3 | 1.81 | 16.7 | 0.12 | 244 | 402 | 575 | 589 | 561 | 28 | 84 | 2.29 | 17.5 |
| R1270 | 17 | −3 | 9.5 | 5.3 | 1.79 | 20.0 | 0.10 | 245 | 404.5 | 580 | 595 | 564 | 31 | 112 | 2.52 | 23.8 |
| RE170 | 17 | −2 | 4.8 | 2.5 | 1.92 | 10.0 | 0.20 | 240 | 432.5 | 641 | 657 | 625 | 32 | 58 | 1.82 | 11.8 |
| R513a | 13 | −4 | 4.9 | 2.7 | 1.81 | 25.0 | 0.08 | 217 | 297 | 383 | 389 | 377 | 12 | 54 | 2.86 | 9.9 |
| R1234yf | 12 | −5 | 4.6 | 2.6 | 1.77 | 25.0 | 0.08 | 215 | 287 | 365 | 370 | 359 | 11 | 50 | 2.86 | 8.8 |
| R152a | 16 | −2 | 4.7 | 2.5 | 1.88 | 14.3 | 0.14 | 229 | 362.5 | 509 | 521 | 496 | 25 | 64 | 2.12 | 13.1 |
| R717 | 15 | −7 | 7.3 | 3.7 | 1.97 | 5.7 | 0.35 | 268 | 822.5 | 1426 | 1474 | 1377 | 97 | 100 | 1.53 | 22.0 |
| R290 | 17 | −3 | 7.8 | 4.3 | 1.81 | 16.7 | 0.12 | 244 | 402 | 575 | 589 | 561 | 28 | 84 | 2.29 | 17.5 |
| R1270 | 17 | −3 | 9.5 | 5.3 | 1.79 | 20.0 | 0.10 | 245 | 404.5 | 580 | 595 | 564 | 31 | 112 | 2.52 | 23.8 |
| RE170 | 17 | −2 | 4.8 | 2.5 | 1.92 | 10.0 | 0.20 | 240 | 432.5 | 641 | 657 | 625 | 32 | 58 | 1.82 | 11.8 |

Figure 7:
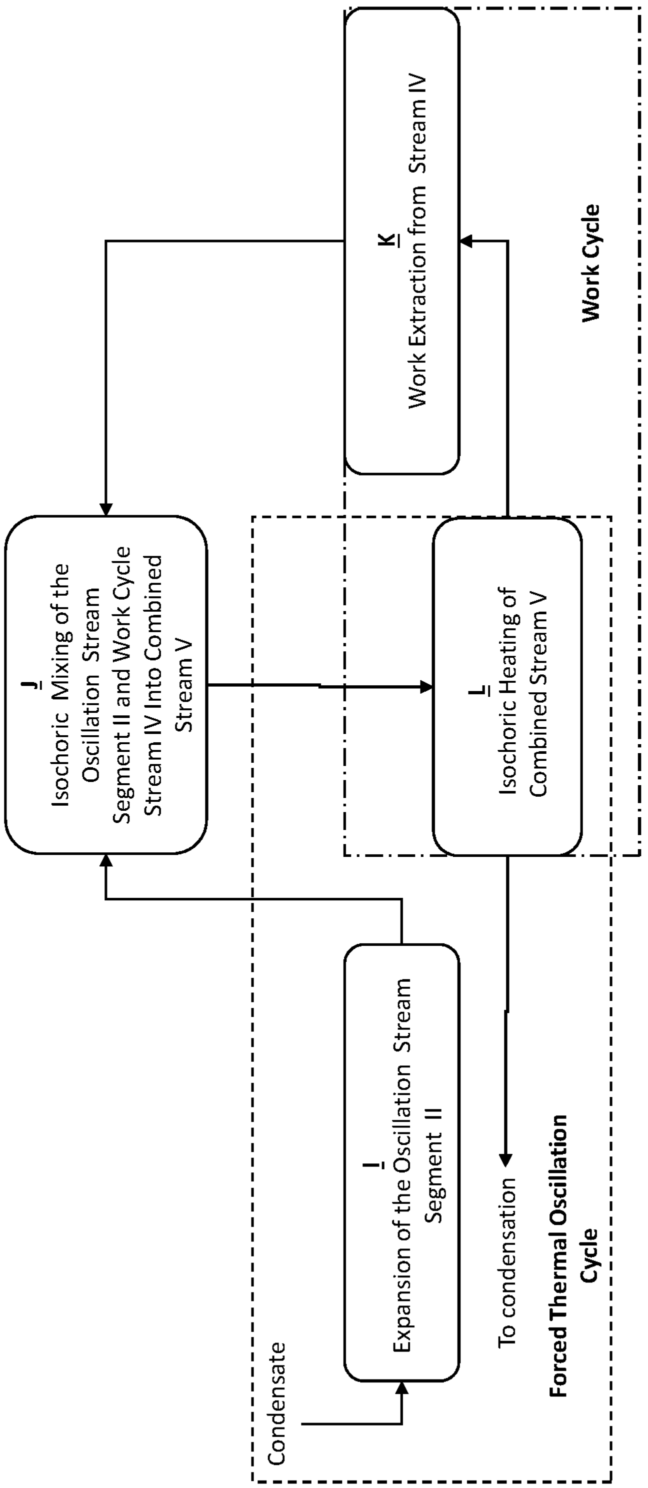
FIG. 7 is a flow chart depicting the interaction of linked forced oscillation cycle and work cycles at each of the processing steps, according to an embodiment.

FIG. 7 depicts a flow chart depicting the interaction between oscillator and working streams during each of the processing steps of thermally oscillating work extractor 9A, of FIG. 6B, according to an embodiment.

As shown, in the thermal oscillation cycle condensate is expansion cooled in step I as described above. Concurrently, in the work extraction cycle, work is extracted from a fraction of combined oscillation-work stream IV in step K. In step J, the expansion cooled condensate of the oscillation cycle and the expanded working fluid of the working cycle are isochorically mixed in step J and then isochorically heated as a combined stream V in step L. The isochoric mixing and isochoric vaporization prevent intensive mechanical work on the fluid stream to advantageously eliminate explicit heat discharge and preserve all heat content within the cycling fluid: with the exception of heat losses associated with any process. The isochoric mixing occurs at state 5' to form a combined stream V having an average state of 5 and 7 at a temperature less than the temperature at which the heat of condensation was released, thereby enabling capture of the condensation heat as noted above. Upon mixing, the oscillation and work cycles overlap as shown in FIG. 6A. Combined stream V is isochorically vaporized and further heated with released condensation heat and external heat to from state 5' through 5" to 6 as described above.

Figure 8:
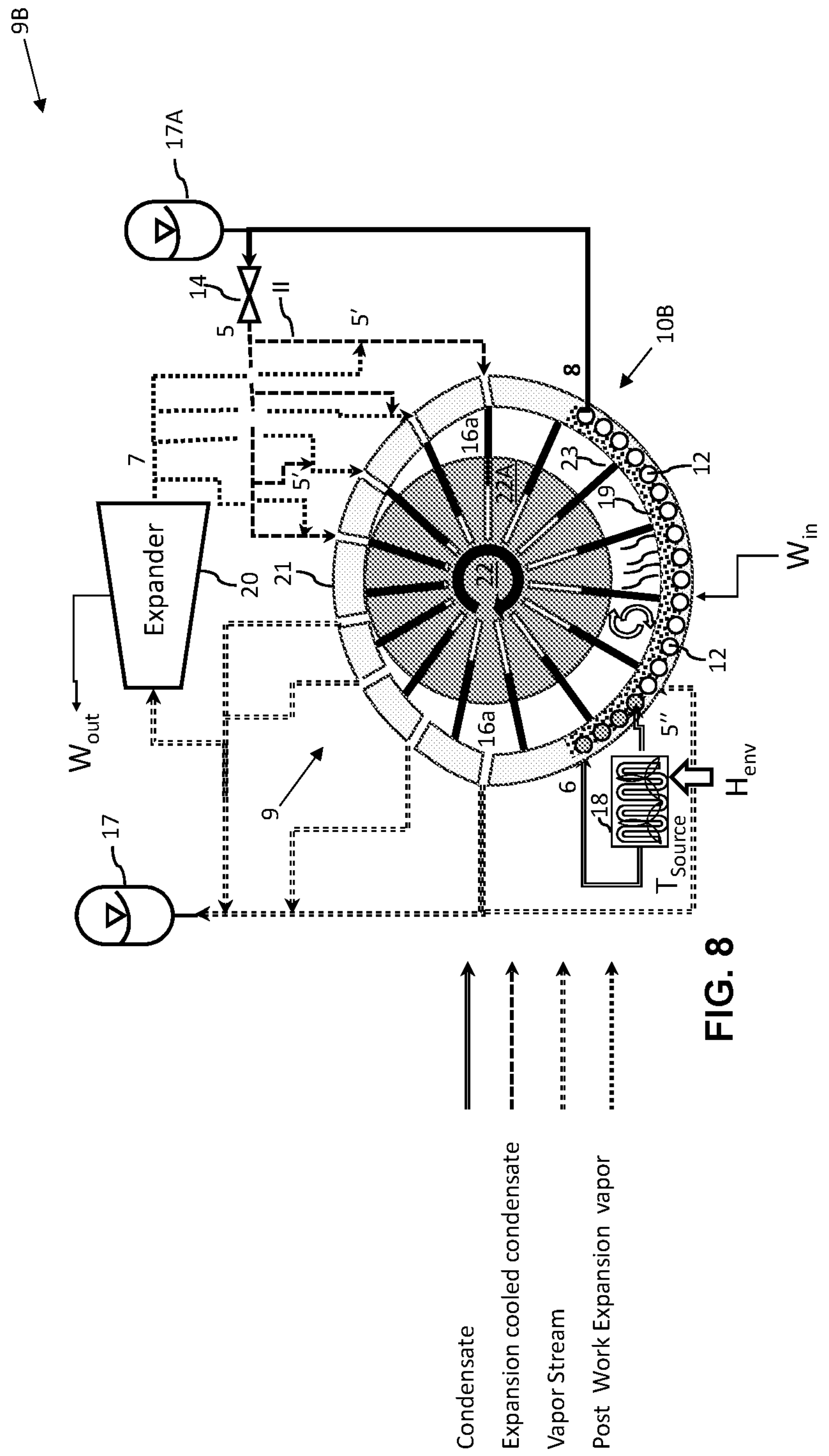
FIG. 8 oscillator driven with cross-sectional side-view of a vane-heater pump implementing the linked oscillation and work cycles of FIG. 6A.

FIG. 8 depicts a second embodiment of the oscillating work extractor 9A employing a vane-based, isochoric heater 10B to implement the cycles of FIG. 6A.

As shown, the system 9B is analogous to the system depicted in FIG. 6B and includes isochoric heater pump 10B, vapor accumulator 17, liquid accumulator 17A, and expansion valve 14, and heater 18. However, vane-based isochoric heater pump 10B is implemented as a modified vane pump having off-centered rotor 22 mounted in housing Operation is generally implemented as described above in the context of the screw-driven embodiment. Combined oscillation-work stream V is fed into vane heater 10B as multiple feeds in accordance with increasing chamber size during rotor rotation. During rotor rotation, combined stream V is vaporized and heated while contacting porous surface 19 with heat of condensation released by stream segment I during conveyance through channels 12 and any additional external heat $Q_{in}$ provided by heater 18. As rotor rotation further advances, vanes 23 begin to retract and reduce the volume of chambers 16*a* and eject vaporized stream segment V prior to mechanical compression to ensure the necessary isochoric heating. Accordingly, the vaporized stream exits vane heater 10B through a plurality of outlets in accordance with chamber size to ensure isochoric heating. After heating, the high temperature and pressure stream is expanded in a turbine 20 or equivalent expander to extract work $W_{out}$ to state 7 and then isochorically recombines with valve-expanded stream segment II to repeat the cycle as noted above. In certain variant embodiments, the heater pump exit port is throttled with an exit valve to enable mechanical compression to the fluid to completion of the oscillation cycle.

In a variant embodiment, expansion of condensate is implemented through a turbine or similar work extraction device to advantageously extract additional work from the oscillator-engine system 10B.

Variant embodiments employ various forms of constant-volume heater isochoric pumps such as a progressive cavity pump, a piston pump, a lobe pump, and/or a gear pump, for example. It should be appreciated that in certain embodiments, the isochoric vaporization is implemented through other means in the absence of pumping during vaporization, such as valved heating chambers operative to release vapor responsively to threshold pressure, minimizing compression work on the vapor against the valves during vaporization.

FIG. 9A depicts a variant embodiment of linked oscillation and work extraction cycles. As shown, the combined stream of $m_1$ and $m_2$ is vaporized from two condensation heats shown as $Q_{osc1}$ and $Q_{osc2}$ in addition to external $Q_{in}$ to complete isochoric heating to state 6. As shown, at point 6, the combined stream of $m_1$ and $m_2$ splits into three stream fractions: one stream fraction undergoes condensation to state 8, a second stream fraction is compressed through external applied work $W_{in}$ to state 6', and a third stream fraction undergoes expansion for work extraction to state 7. The stream fraction compressed to state 6' undergoes condensation to state 8' at a higher temperature than the condensation from state 6 to 8 and therefore provides a greater temperature gradient for isochoric heating of combined stream of $m_1$ and $m_2$. Expanded work stream having a mass of $m_1$ isochorically mixes with the expansion cooled oscillation segment of mass $m_2$ from 8 and 8' to state 5. The isochoric mixing at state 5' brings combined stream to an average enthalpy of $H_{mix}$.

Figure 9B:
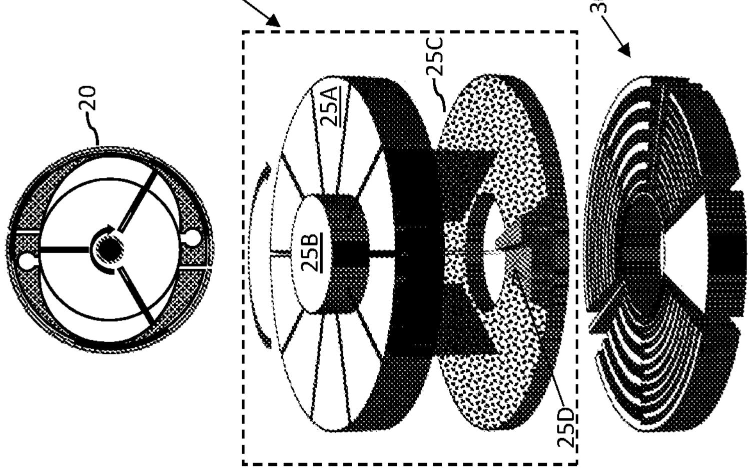
FIG. 9B is an exploded, partial-perspective view of a disc-based oscillator work extraction system, according to third embodiment.

FIG. 9B is an exploded partial perspective view of the primary components of a disc-based oscillator work extraction unit as arranged in their housing, according to third embodiment. The unit includes a condenser 30 and a vertical vane-heater pump 25, vertically stackable when deployed all linked to a work extraction device 20. Condenser 30 includes one or more sets of progressively narrowing circumferential channels that provide additional surface area to facilitate heat transfer as a high temperature working fluid cools during advancement through the cooling channels. Vertical vane heater 25 includes a heat transfer disk 25C in thermal communication with condenser 30 in deployment. Heating plate 25C is constructed from highly heat conductive materials such as copper, aluminum nitride and other materials providing such functionality, and has a porous surface to increase surface area and consequent heat transfer and evaporation. Disk 25C is also fitted with a wedge configured to open and close vanes following the wedge surface geometry during rotation, as will be further discussed. Vertical vane heater 25 also includes a plurality of radial vanes slidably mounted in a vane plate 25A driven by a shaft 25B. During shaft rotation, the vanes follow the surface of the disk 25C and rise and lower in accordance with the contour of the disk wedge. The rising and lowering of the vanes during rotation provides valve functionality, allowing fluid injection and rejection to the vane heater during operation. The synchronization with the fluid flow will be further discussed.

Figure 9C:
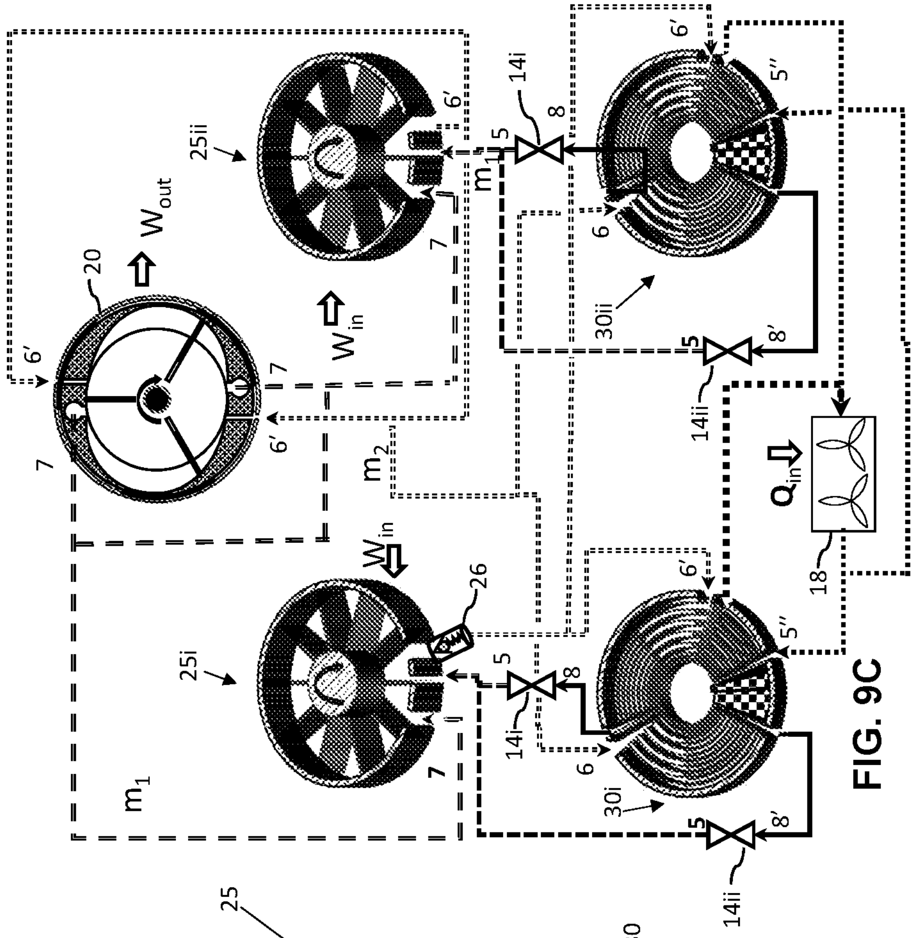
FIG. 9C depicts stream flow between the primary components of the disc-based oscillator work extraction system of FIG. 9B implementing the integrally linked oscillation and work cycles of FIG. 9A.

FIG. 9C depicts stream flow between the primary components of the disc-based, thermally-oscillating work extraction system of FIG. 9B implementing the thermal oscillation and work extraction cycles of FIG. 9A.

As shown, this embodiment includes two condensation discs 30*i* and 30*ii*, two vertical vane heat exchanger pumps 25*i* and 25*ii*, an expander 20, expansion valves 14*i* and 14*ii*, and a heat exchanger linked to external heat source 18. Only the vane assemblies are shown and heating plates 25C depicted in FIG. 9B are omitted along with liquid and vapor accumulators, all for the sake of clarity It should be appreciated that heat released in the two condensers 30*i* and 30*ii* conducts through each heat exchange disk 25C mounted on its respective condenser. In should be further appreciated that in a certain embodiment, vane 25*ii* is implemented in sets of two or more and in other variant embodiments, a plurality of throttled vane heater pumps is also employed.

Figure 9D:
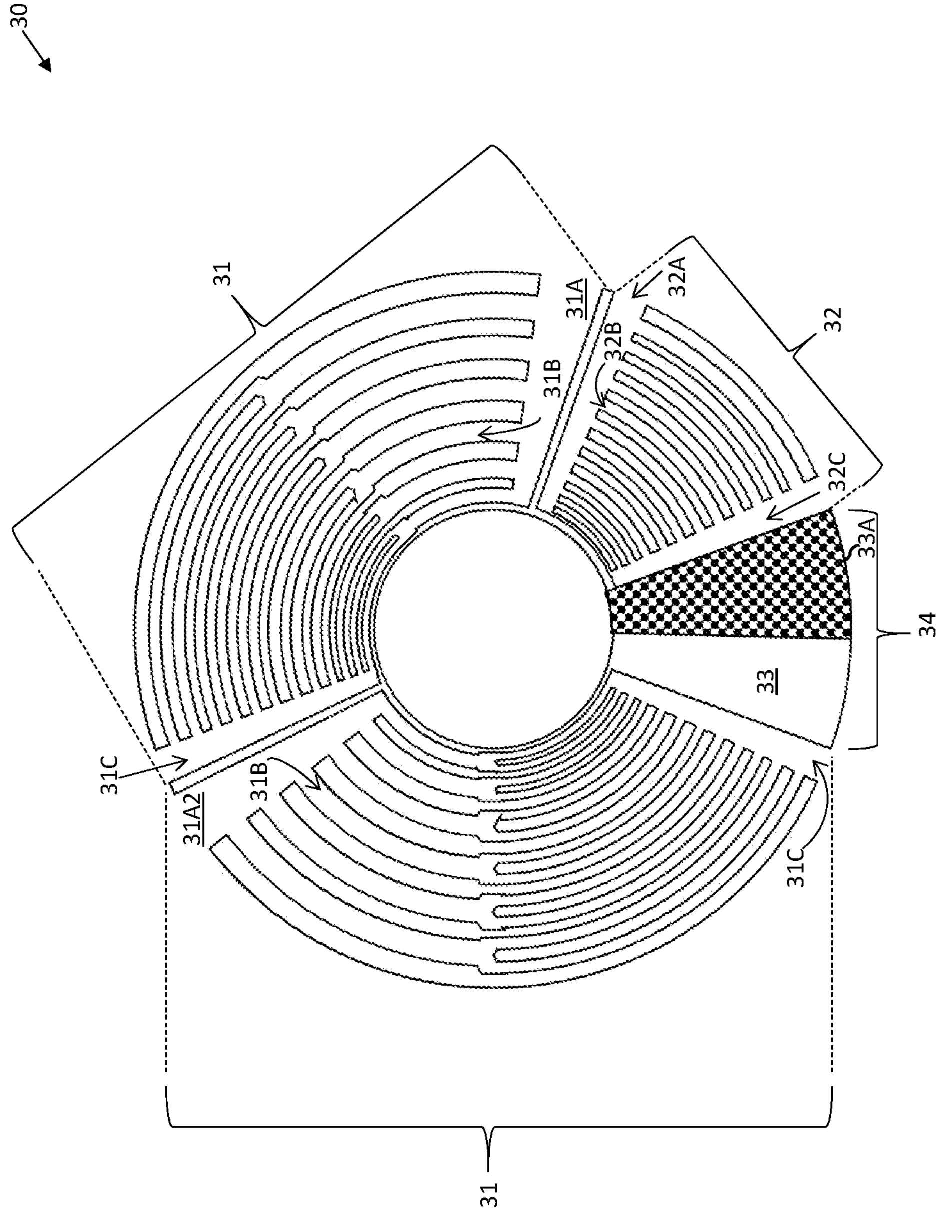
FIG. 9D is a schematic top view of a disc condenser of the disc-based oscillator work extraction system of FIG. 9B.

In operation, maximum high temperature and pressure fluid is fed into a first intake 31A (at state 6') of condensers 30*i* and 30*ii* and the fluid advances through a first set of progressively narrow condenser channels as shown in FIG. 9D. After condensation, the condensate from each condenser is expanded through each respective expansion valve 14*i* from a state of 8' to 5. Concurrently, high temperature and pressure fluid is fed into a second condenser intake 31A2 (state 6) and the fluid advances through a second set of progressively narrow condenser channels and expanded through expansion valves 14*ii* from a state of 8 to 5. Auxiliary heat is also provided from external heat exchanger and cooled in each of the condensers 30*i* and 30*ii* where the auxiliary heat stream cools and the heat is transferred to the heating plate 25C. Condensation heat transferred though heating plate 25C is captured by a second stream segment of the oscillation stream in each of the two vertical vane heaters 25*i* and 25*ii* as will be further discussed. Concurrently, work is extracted in expander 20 from state 7 to 6. Then the stream is split into two streams and each of the expanded streams are isochorically mixed with each of the expansion cooled, oscillation stream segments in each of the vertical vane heaters 25*i* and 25*ii*. As shown in FIG. 9A, isochoric heating of the combined oscillation and work stream is heated from condensation heat released from each of the two condensers 30*i* and 30*ii* and also the auxiliary heat supplied by heat exchanger 18 in thermal communication with an external heat source implemented as a heat transfer material such as hot gas or liquid, or directly with a heat source such as ambient air, a solar heater, or a combustion chamber.

It should be appreciated that the outer surfaces of condensers 30*i* and 30*ii* are insulated except for the surface in thermal contact with heating plate 25C to minimize heat loss and maximize heat transfer.

FIG. 9D is a schematic top view disc condenser 30, according to an embodiment. As shown, condenser 30 includes a plurality of cooling channel sets 31 and 32 plus an insulator segment 34. As shown, cooling channel set 31 includes a high temperature inlet 31A, 31A2 and channels 31B in communication with a reduced width channel branches to maximize heat transfer area for condensation and cooling of a vapor-liquid cycling fluid as it is conveyed through channels 31B and exists as condensate through outlet 31C. Condenser 30 also includes a channel set 32 dedicated to condensing or cooling an externally heated stream for introducing externally generated heat into the working fluid to complete the cycle of FIG. 9A from point 5'' to 6, for example. Here too, a high-temperature heating stream is fed through inlet port 32A and conveyed through channels 32B to outlet 32C, thereby enabling heat transfer into the walls of channels 32B and heat exchange plate 25C of FIG. 9B when assembled. All channel walls are constructed from highly heat conductive materials such as copper, aluminum, aluminum nitride, other materials providing such high thermal conductivity. In contrast, section 34 is a non-conductive section including two sections, 33 and 33A, each of different heights, in a certain embodiment. Condenser segment 34 is aligned with a non-heat conductive heating wedge 25D most clearly visible in FIGS. 9F-9H.

It should be appreciated that in certain embodiments, cooling channels are implemented without branches and the channels progressively decrease in width. Furthermore, in a certain embodiment, additional cooling sets are employed, all in accordance with cooling requirements.

Figure 9F:
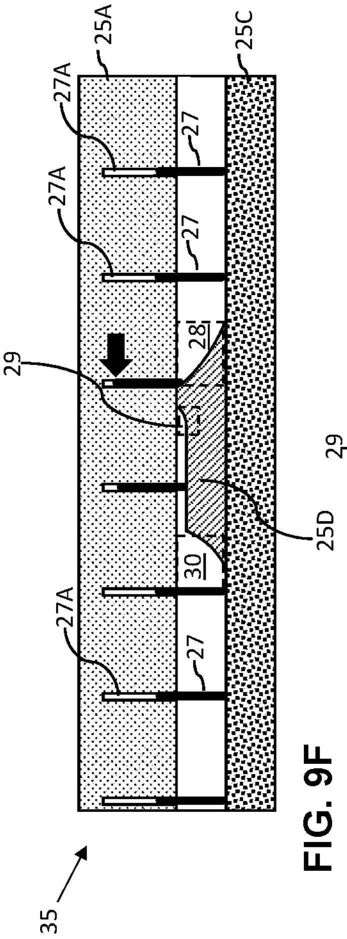
FIGS. 9F-9H depict schematic cross-sectional side views of an isochoric vertical-vane heater pump at a fluid ejection stage and two intakes stages, according to an embodiment.
Figure 9G:
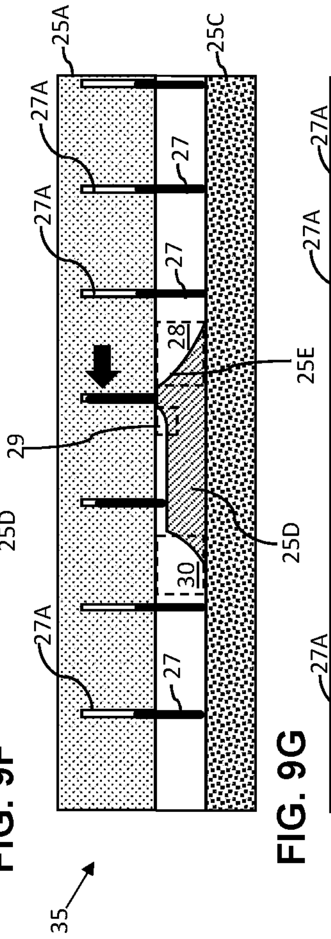
Figure 9H:
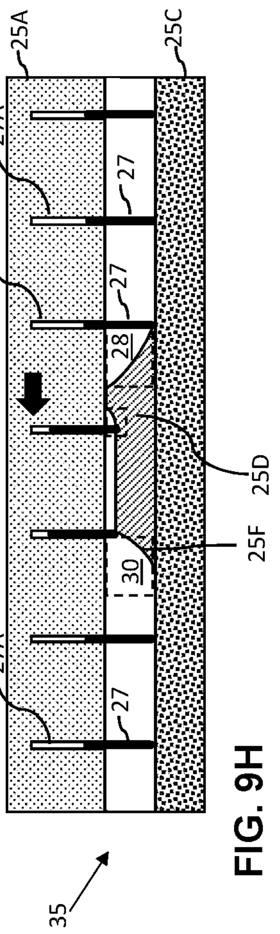
Figure 9E:
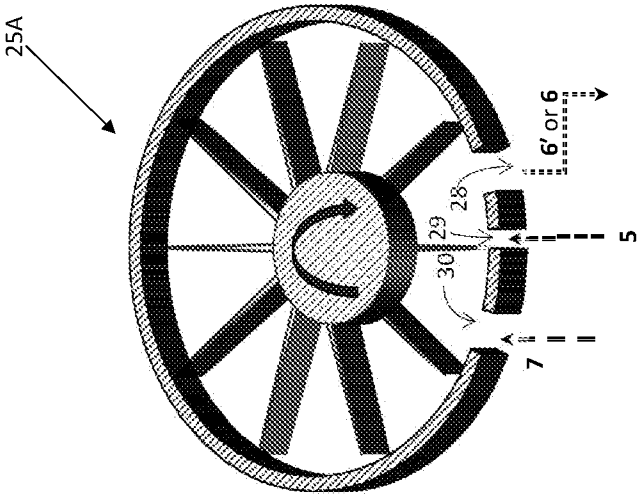
FIG. 9E is a schematic, perspective top view of a vane assembly of the disc-based oscillator work extraction system of FIG. 9B.

FIG. 9E is a partial perspective view of a vane assembly 25A of vertical vane-heater pump 25 without its cylindrical vane housing, according to an embodiment. As shown, vane assembly 25A includes a plurality of radial vanes 27 defining constant volume chambers for isochoric mixing and heating of expansion cooled oscillation fluid together with post expansion working fluid after work extraction. As shown, in an embodiment, expansion cooled oscillation fluid 5 is fed into the heater through inlet 29 and post expansion working fluid 7 enters through inlet 30 as vane blades 27 rotate in a clockwise direction. After heating during vane rotation, the fluid is ejected through outlet 28 as either maximum high temperature fluid 6' or high temperature fluid 6 depending on the external work input added to the condensation heat driving the isochoric vaporization. The work is generated in the form of overcoming valve resistance of a valve as shown in FIG. 9C, valve 26, according to a certain embodiment. It should be appreciated that in other embodiments the work is input by way of a compressor.

FIGS. 9F-9H are schematic, cross-sectional side views of vertical vane-heater pump 25 depicting vane assembly 25A in thermal communication with heating plate 25C at various stages of rotation.

Specifically, during rotation, vanes 27 follow the surface geometry of heating plate 25C and plate wedge 25D. The volume between vanes 27 defines a constant volume in which a combined stream of oscillation and working fluid is isochorically vaporized from condensation heat conducted through heating plate 25C. The oscillation and working fluid are isochorically mixed by feeding the oscillation fluid and the working fluid separately into a variable volume chamber defined by vertically slidable vanes 27 following contours of top surface of heating plate 25C and heating wedge 25D. High temperature combined fluid is driven out of an outlet port 28 as a chamber volume progressively decreases to zero volume as vane 27 is pushed into its slot 27A by wedge incline 25E during plate rotation as shown in FIG. 9G.

As shown in FIG. 9G, chamber separation is preserved by wedge abutment with vane plate 25A. Vane 27 further advances to a first intake port 29 and follows a recess 25E enabling intake of expansion-cooled oscillation fluid 5 into a reduced volume corresponding to the volume of expansion cooled condensate to ensure isochoric intake in which the expansion-cooled oscillation fluid is neither compressed nor expanded.

In FIG. 9H, vane 27 further advances to a larger intake port 30 as vane 27 further extends as it follows the downward slope 25F of wedge 25D so that the expansion-cooled oscillation stream 5 fed through inlet port 29 and post-expansion work stream 7 fed through inlet port 30 are isochorically mixed.

Figure 10:
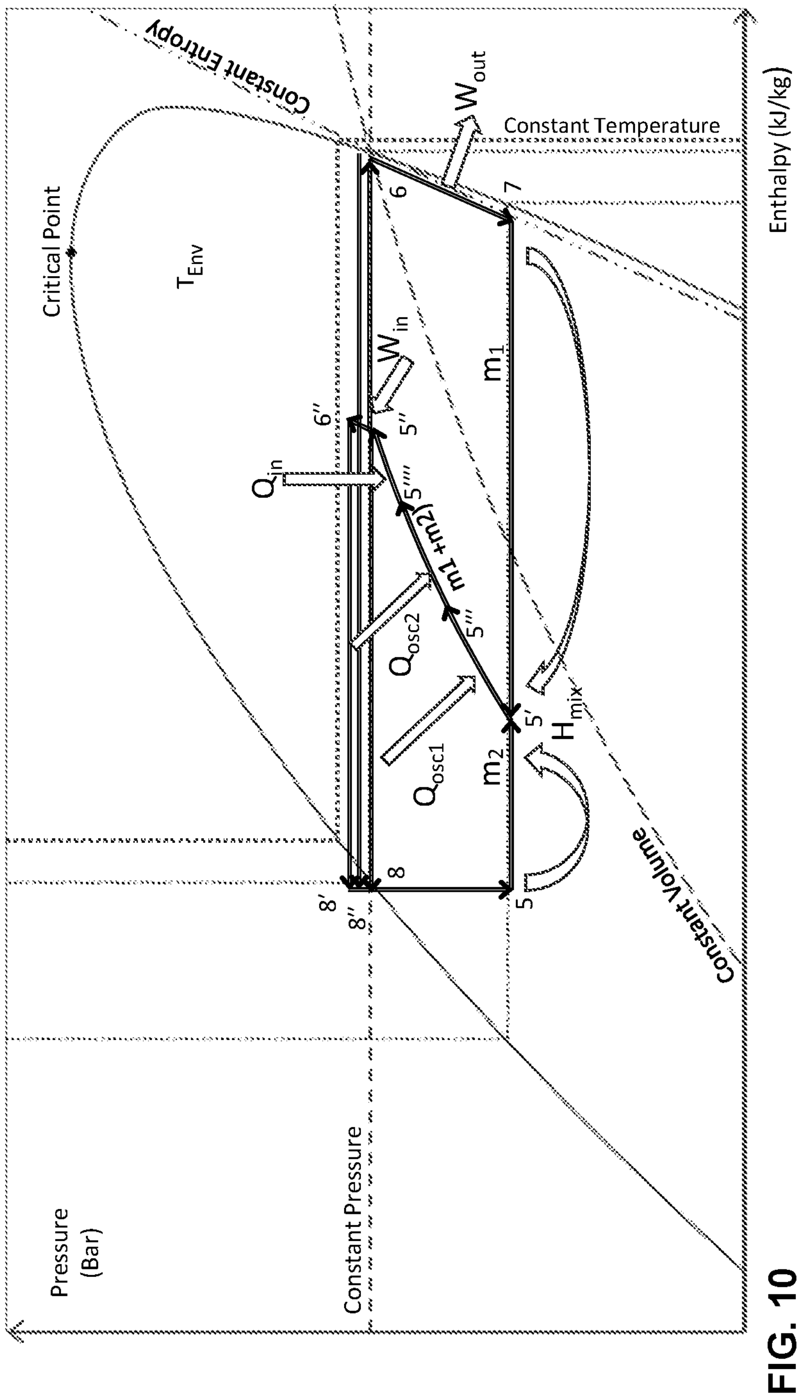
FIG. 10 depicts linked oscillation and work cycles where the isochoric heating is implemented to a quality of less than 1.0, according to an embodiment.

FIG. 10 depicts a variant form of the linked thermal oscillation and work extraction cycles of FIG. 9A. As shown, the oscillation and work cycles are analogous to those of FIG. 9A, except combined oscillation-work stream of $m_1$ and $m_2$ are isochorically heated to a quality of significantly less than 1.0 to ensure that the oscillation cycle remains within the phase transition envelope: wherein $m_2$ is the mass flow of the oscillation cycle and $m_1$ is work cycle, fraction (a) defines the ratio of specific enthalpies of $m_1$ of post expansion stream 7-5' and of expansion cooled oscillation stream segment $m_2$ from 5-5'. For example, $m_2$=(a)$m_1$ and combined stream has a mass of $m_2$+$m_1$ or (a+1) $m_1$. Quality (q) at point 8 is 0 and q at point 6 is 1.0, and at point 5", $q_a$ is within the range of $0.05<q_a\leq 1.0$ and fraction (b) quality at point 6" is within the range of $0.0<b\leq 0.5$ defines the fraction of the total mass. In the respective flow streams, the masses are as follows, for example:

$$5''-6''-8'\colon\ 0.Zm_2 = b(m_2+m_1) = b((a+1)\,m_1 \text{ in kg.}$$

$$5''-6\colon\ q(1-b)(m_2+m_1) = q_a(1-b)(a+1)\,m_1 \text{ in kg.}$$

$$5''-8\colon\ 0.Xm_2 = (1-q_a)(1-b)(m_2+m_1) = (1-q_a)(1-b)(a+1)\,m_1 \text{ in kg.}$$

$$7-5'\colon\ m_1 \text{ in kg.}$$

$$6-8''\colon\ 0.Ym_2 = (1-q_a)(1-b)(m_2+m_1) - m_1 = 0.Ym_2(1-q_a)(1-b)(a+1)\,m_1 - m_1 \text{ in kg.}$$

Wherein "X", "Y", and "Z" are fractions of $m_2$ in each respective designated stream.

In implementation, the stream is split into two portions at point 5" within the transition envelope. The liquid and vapor of one portion are separated from each other by way of a separator. The separated vapor is conveyed to point 6 where it is again split prior to expansion. A work portion is expanded, and the non-expanded portion is condensed to point 8". The remaining non-separated stream at split point 5" is compressed from externally supplied work to state 6" and condensed to state 8'. The condensation heat released from each of the two condensations is used to isochorically heat from mixing point 5'-5'", further from 5'" to 5"" and external heat $Q_{in}$ is provided to complete the isochoric heating to point 5". Work $W_{in}$ is supplied to further compress a fraction of the combined stream to point 6". Isochorically vaporizing to a quality of less than a value of 1.0 advantageously prevents inadvertent isochoric superheating. Superheating necessitates heat rejection because the high kinetic energy of superheated vapor molecules prevents intermolecular bonding leading to condensation. This intermolecular bonding within the condensate advantageously enables storage of thermal energy later released in expansion cooling to sub-ambient heat sink.

Simulation Results

The following are simulation result that demonstrate work output levels as a function of mass flow rate for the integrally linked cycles of FIG. 10 employing working fluid R717 given a combined pump volumetric flow rate of 360 $m_3$/hr. $T_{high}$ and $P_{high}$ refer to the hottest condensation segment 6"-8', $T_{mid}$ and $P_{mid}$ refer to the cooler condensation segments and 6-8". "H" refers to enthalpy and the designated states.

| $T_{high}$ ° C. | $T_{mid}$ ° C. | $T_{low}$ ° C. | $P_{high}$ Bar | $P_{mid}$ Bar | $P_{low}$ Bar | P mid/low ratio | $H_{5,\,8,\,8',\,8''}$ kJ/kg | $H_{5'}$ kJ/kg | $H_{5'''}$ kJ/kg | $H_{5''''}$ kJ/kg | $H_{5''}$ kJ/kg | $H_{6''}$ kJ/kg | $H_6$ kJ/kg | $H_7$ kJ/kg |
|---|---|---|---|---|---|---|---|---|---|---|---|---|---|---|
| 15 | 15 | −7 | 7.3 | 7.3 | 3.7 | 1.97 | 268 | 823 | 1426 | 1426 | 1474 | 1474 | 1474 | 1377 |
| 20 | 15 | −7 | 8.7 | 7.3 | 3.7 | 1.97 | 268 | 823 | 1124 | 1431 | 1474 | 1496 | 1474 | 1377 |
| 20 | 15 | −7 | 8.7 | 7.3 | 3.7 | 1.97 | 268 | 513 | 779 | 851.3 | 871 | 886 | 1474 | 1377 |
| 20 | 15 | −7 | 8.7 | 7.3 | 3.7 | 1.97 | 268 | 642 | 976 | 1081 | 1112 | 1124 | 1474 | 1377 |
| 20 | 15 | −7 | 8.7 | 7.3 | 3.7 | 1.97 | 268 | 730 | 1120 | 1237 | 1275 | 1297 | 1474 | 1377 |

-continued

| $T_{high}$ ° C. | $T_{mid}$ ° C. | $T_{low}$ ° C. | $P_{high}$ Bar | $P_{mid}$ Bar | $P_{low}$ Bar | P mid/low ratio | $H_{5, 8, 8', 8''}$ kJ/kg | $H_{5'}$ kJ/kg | $H_{5'''}$ kJ/kg | $H_{5''''}$ kJ/kg | $H_{5''}$ kJ/kg | $H_{6''}$ kJ/kg | $H_6$ kJ/kg | $H_7$ kJ/kg |
|---|---|---|---|---|---|---|---|---|---|---|---|---|---|---|
| 20 | 15 | −11 | 8.7 | 7.3 | 2.9 | 2.52 | 268 | 600 | 1154 | 1241 | 1275 | 1297 | 1474 | 1355 |
| 20 | 15 | −22 | 8.7 | 7.3 | 1.8 | 4.06 | 268 | 400 | 1219 | 1255 | 1275 | 1297 | 1474 | 1307 |

| 6-7 Exp $m_1$ kg/cyc | 5''-8 Osc $0 \cdot Xm_2$ kg/cyc | 6-8'' Osc $0 \cdot Ym_2$ kg/cyc | 5''-6''-8' Osc $0 \cdot Zm_2$ kg/cyc | 5'-5'' dnsty kg/m3 | 5'-5'' flow m3/cyc | 5'' mass | 5'' qual | 5''''-5'' $Q_{in}$ kJ/cyc | 5''-6'' $W_{in}$ kJ/cyc | 6-7 $W_{out}$ kJ/cyc | $W_{out-net}$ kJ/cyc | $W_{in}$ MJ/hr | $W_{out}$ MJ/hr | $W_{out}$ kW | $W_{pmp}$ kW | $W_{net}$ kW |
|---|---|---|---|---|---|---|---|---|---|---|---|---|---|---|---|---|
| 1.0 | 0.00 | 1.00 | 0.00 | 5.7 | 0.35 | 2.0 | 1.00 | 97 | 0 | 97 | 97.0 | 0.00 | 99.8 | 27.7 | 1.5 | 22 |
| 1.0 | 0.00 | 0.50 | 0.50 | 5.7 | 0.35 | 2.0 | 1.00 | 86 | 11 | 97 | 86.0 | 11.3 | 99.8 | 24.6 | 1.5 | 19 |
| 1.0 | 2.00 | 1.00 | 0.53 | 11.1 | 0.41 | 4.5 | 0.50 | 89 | 7.90 | 97 | 89.1 | 6.98 | 85.7 | 21.9 | 1.9 | 17 |
| 1.0 | 0.78 | 0.82 | 0.37 | 8.0 | 0.37 | 3.0 | 0.70 | 92.1 | 4.38 | 97 | 92.6 | 4.25 | 94.2 | 25.0 | 1.7 | 20 |
| 1.0 | 0.35 | 0.77 | 0.27 | 6.7 | 0.36 | 2.4 | 0.84 | 91 | 6.03 | 97 | 91.0 | 6.03 | 97.0 | 25.3 | 1.6 | 20 |
| 1.0 | 0.49 | 1.51 | 0.27 | 6.7 | 0.49 | 3.3 | 0.84 | 113 | 6.03 | 119 | 113 | 4.42 | 87.2 | 23.0 | 1.6 | 18 |
| 1.0 | 1.25 | 5.34 | 0.27 | 6.7 | 1.18 | 7.9 | 0.84 | 161 | 6.03 | 167 | 161 | 1.84 | 50.9 | 13.6 | 1.6 | 10 |

Figure 11A:
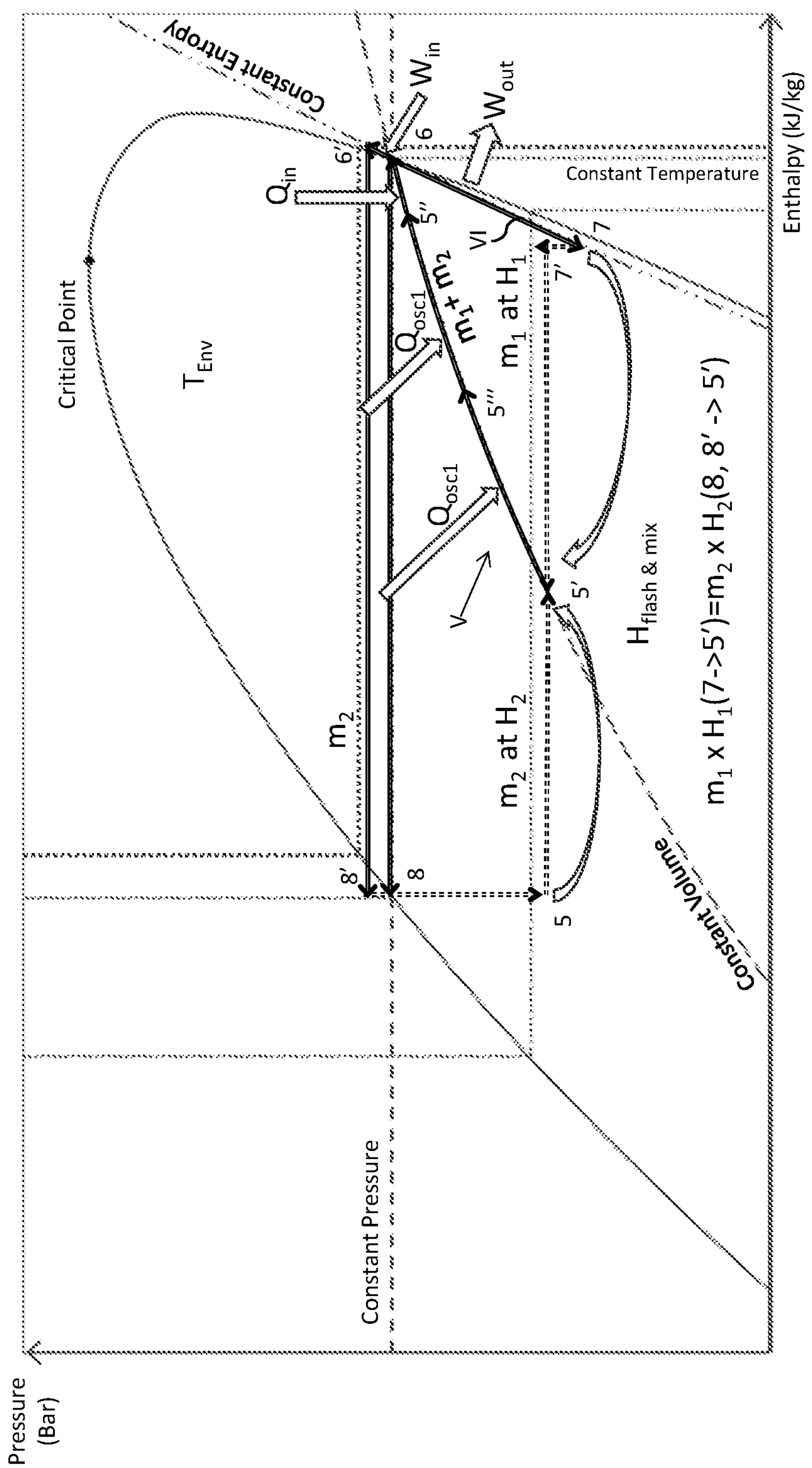
FIG. 11A depicts linked oscillation and work cycles employing flash expansion, according to a variant embodiment.

FIG. 11A depicts variant linked thermal oscillation and work cycles of FIG. 9A in which condensate is expansion cooled using flash evaporation instead of an expansion valve.

As shown, condensate at points 8 and 8' are flash cooled to state 5 and simultaneously mixed with post-expansion working fluid at 5'. The superheating of working fluid to point 7' and subsequent combining at point 5' are depicted to show the relevant thermodynamic states although in practice they are states achieved simultaneously in the system depicted in FIG. 9C except for expansion valves 14*i* and 14*ii* as previously noted.

Figures 11B, 11C, 11D:
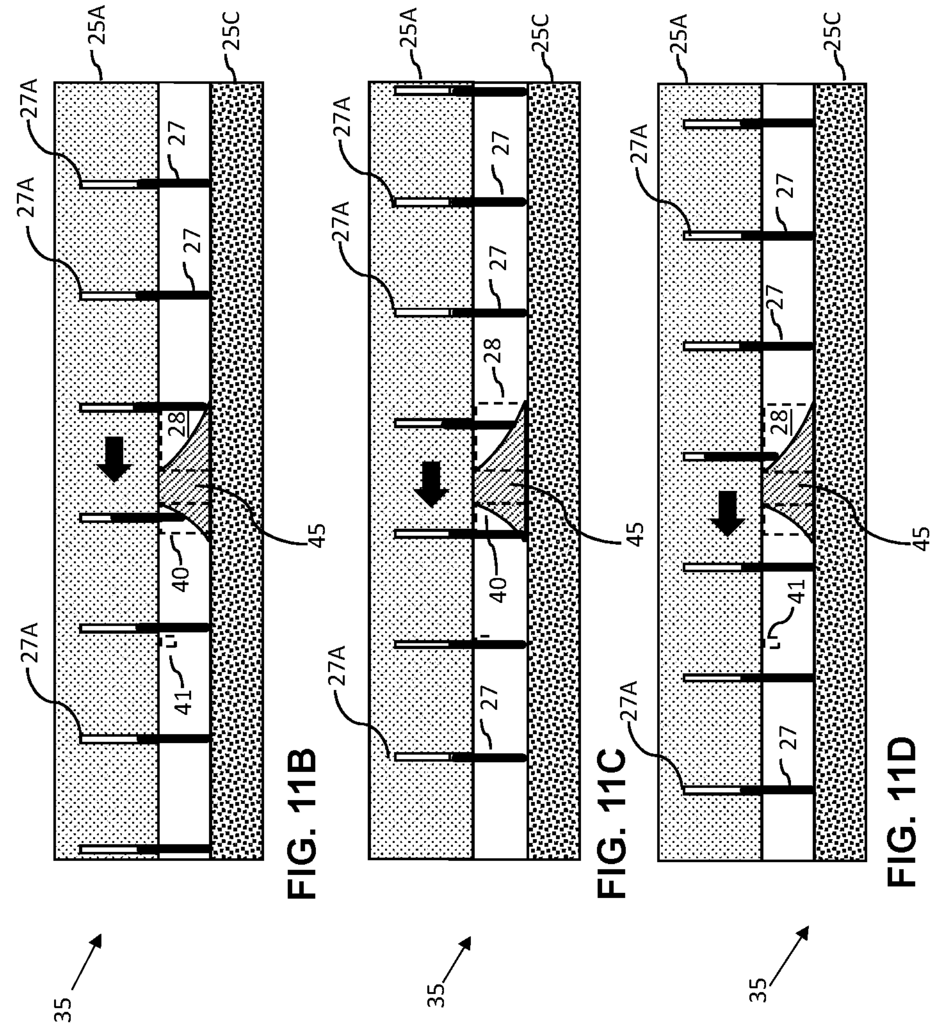
FIGS. 11B-11D depict a schematic cross-sectional side views of an isochoric vane heater pump at a fluid ejection stage and two intakes stages, according to a flash embodiment.

FIGS. 11B-11D are schematic, cross-sectional side views of a variant embodiment of the vertical vane-heater pump 25 of FIGS. 9F-9H at various stages of rotation implementing isochoric mixing through the flash evaporation depicted in FIG. 11A. This variant embodiment uses a heating plate wedge 45 that also has upward and downward inclines and an apex entirely abutting vane plate 25A. Post expansion working fluid after work extraction is fed through inlet port 40 and during vane advancements liquid condensate is fed through port inlet 41 into a low-pressure heater environment, thereby causing a flash evaporation and mixing with post expansion work fluid. Isochoric heating is implemented as vanes rotate around heating plate 25C and high temperature and pressure combined fluid is ejected from outlet port 28 as chamber volume reduces as vane 27 follows the upward incline of plate wedge 45.

Figure 12A:
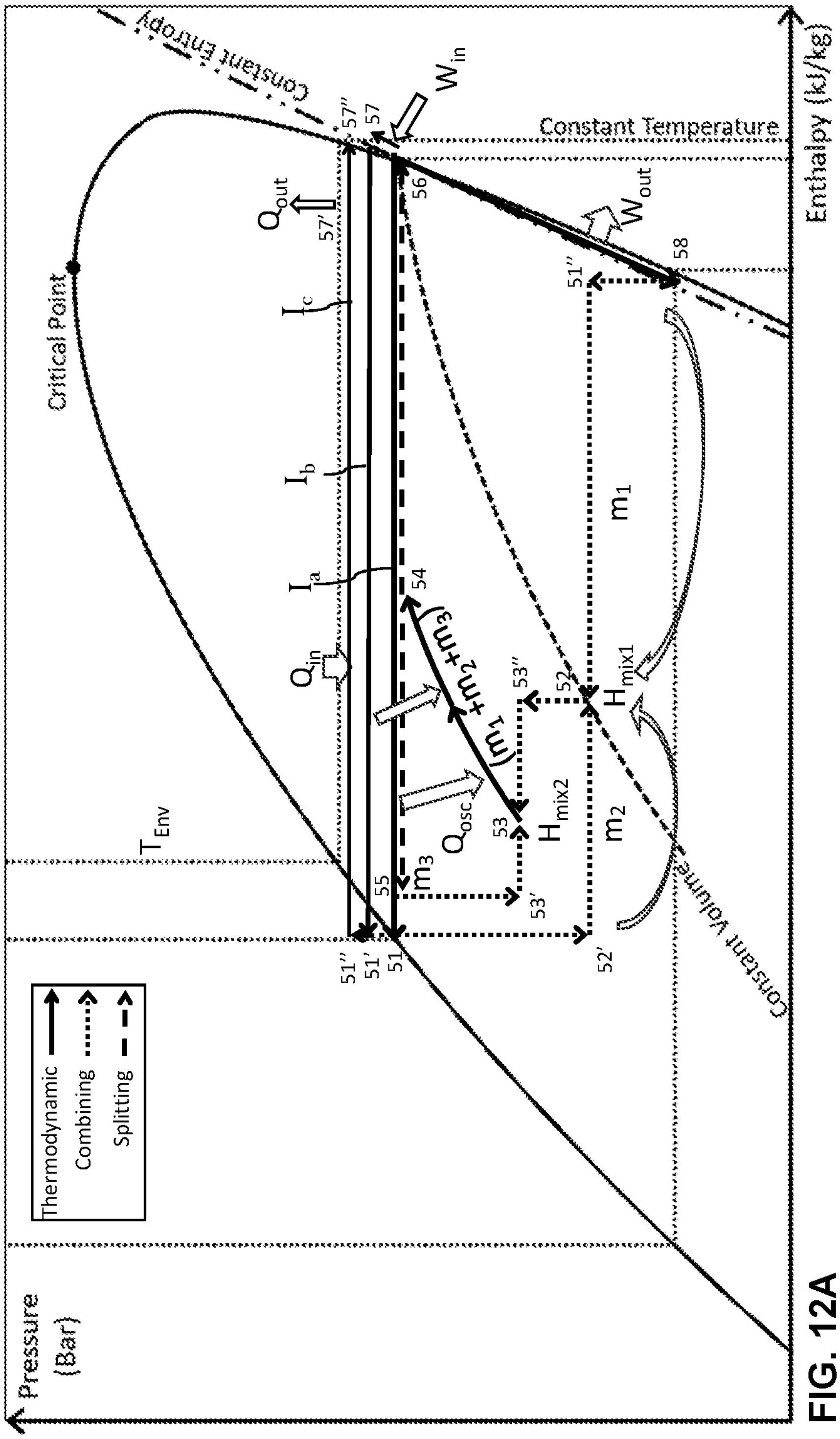
FIG. 12A is P-H diagrams of a linked heat oscillator and work extractor employing isochoric flash and non-circulating isochoric heating, according to an embodiment.
Figure 12B:
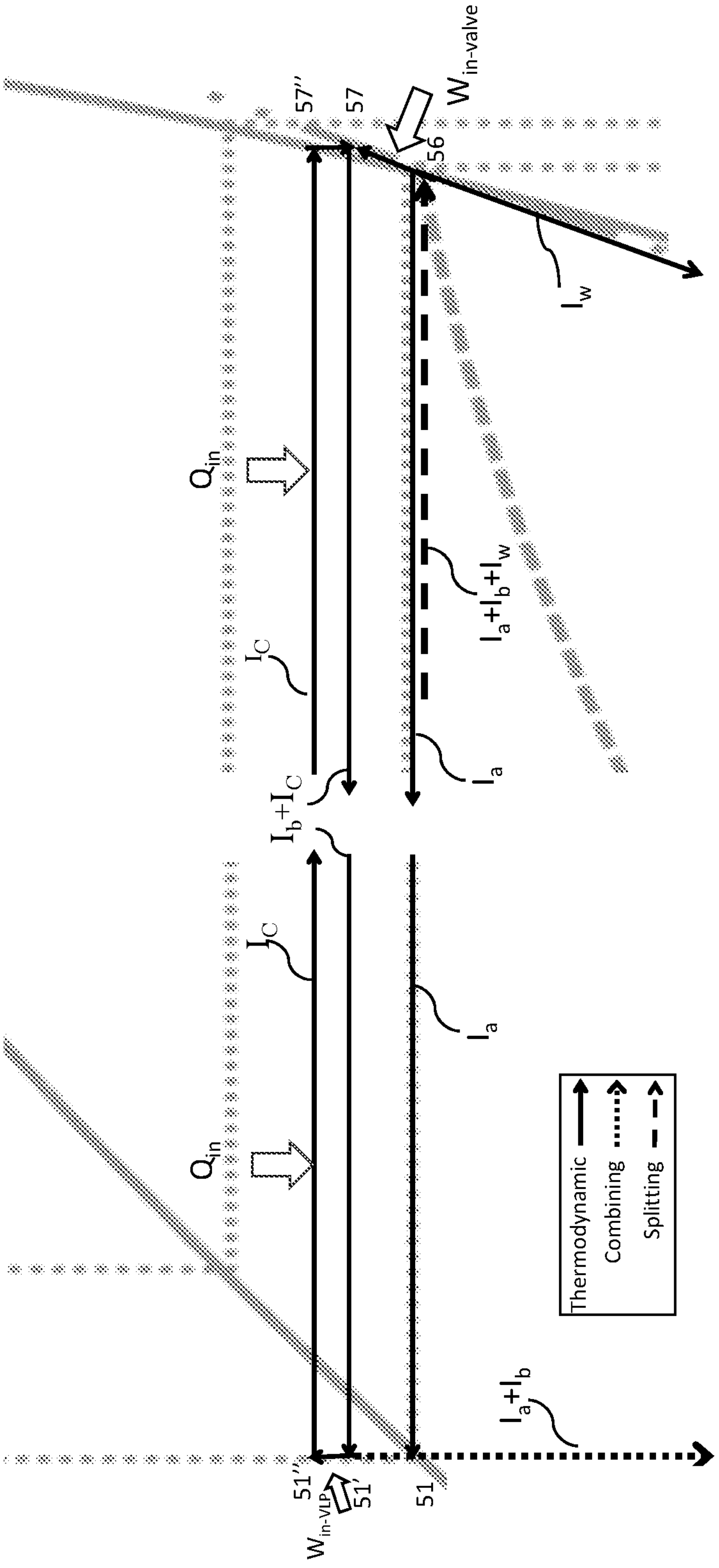
FIG. 12B is an enlarged view of a portions of the P-H diagram of FIG. 12A.

FIGS. 12A-12B depict a variant embodiment of a forced thermal oscillation cycle integrally connected to a work extraction cycle. As noted in other embodiments, heat is rejected at high temperature and absorbed at low temperature to drive low temperature heating and vaporization. The heat release is implemented through high temperature condensation in a first stream segment and concurrent flash cooling of the condensate in a second stream segment in which latent heat energy is released into the resulting vapor. An explanation of the processing steps is presented in the context of the flow chart depicted in FIG. 14. It should be appreciated that there are number of the processing steps that occur almost instantaneously upon contact or splitting of streams. Such streams are presented in either dashed or dotted lines. Furthermore, it should be appreciated that certain lines a depicted in positions shifted from their actual position within the P-H diagram charactering their parameters for the sake of clarity alone. For example, dashed line 54-56 and 54-55 are shifted downward and in practice should disposed at the same height as $I_a$ spanning 51-56. Similarly, $I_c$, spanning 51"-57" are shifted upward and in practice should disposed at the same height as $I_b$. Furthermore, compression line 56-57 is shifted rightward and in practice should follow the constant entropy line.

FIG. 12B is an enlarged view of a portion of the P-H diagram depicted in FIG. 12A. The enlarged view more closed depicts the compression between 56 and 57 achieved through work against and exit valve 69C of pump isochoric pump as will be further discussed in the context of FIG. 14. Also more clearly visible is the cycling of stream segment $I_c$ after fusing with $I_b$ and splitting from stream $I_b$ and being conveyed by very low pressure pump (VLP) 76 between 51'-51"-57"-57 by external evaporator 67.

Figure 13:
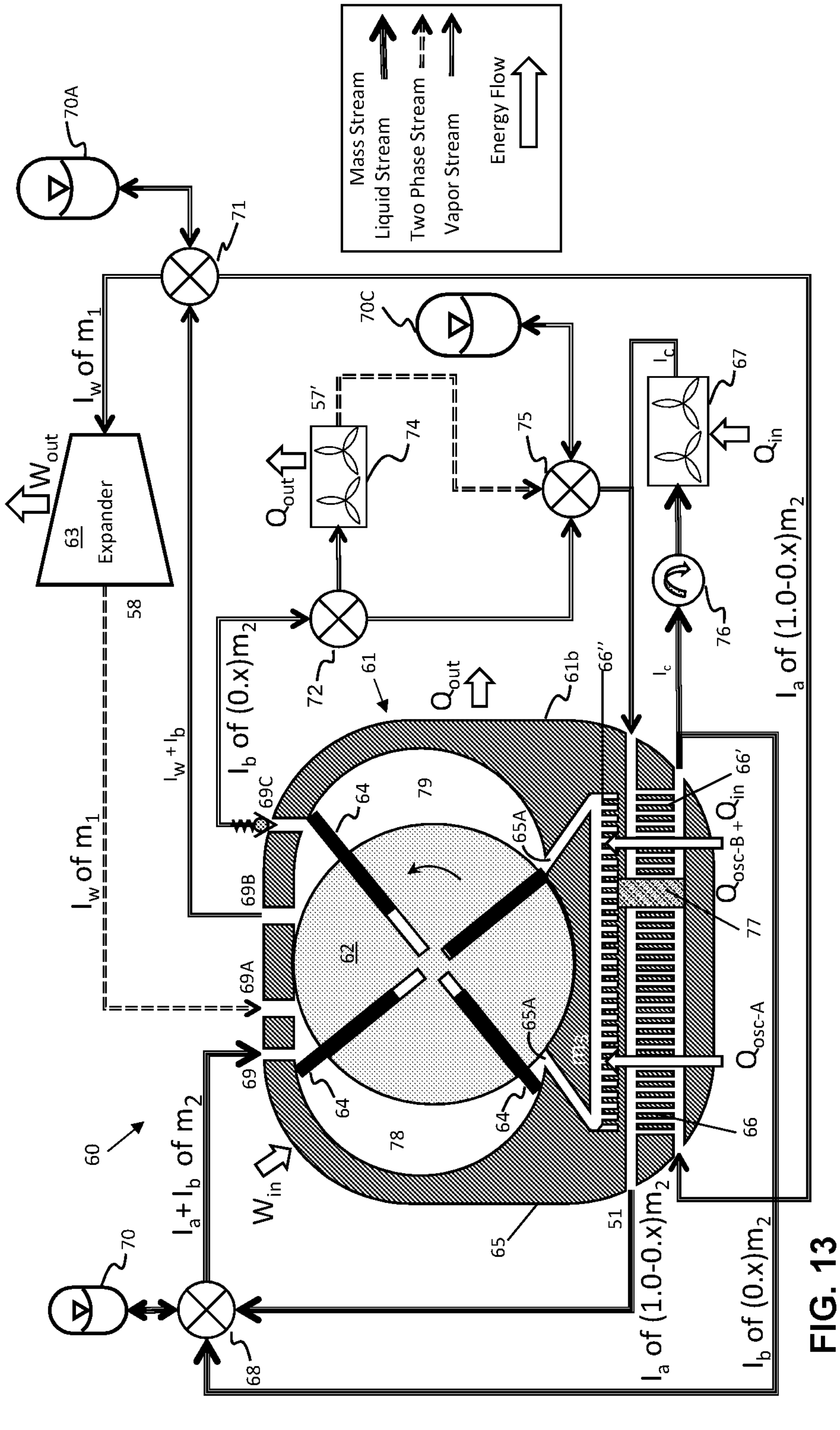
FIG. 13 is a schematic view of the linked heat oscillator and work extractor employing isochoric flash and non-circulating isochoric heating, according to an embodiment.

FIG. 13 is a schematic view of a variant embodiment of a thermal-oscillating work-extractor 60 formed from an variant embodiment of an isochoric, pump 61 integrally linked to work extraction device 63 collectively implementing the cycles depicted in FIG. 12A. Isochoric pump 61 includes a motor-driven rotor 62 having retractable vanes 64 operative to follow the contour of the inner housing surface geometry during rotation. The vane spacing defines the input and output volumes and during fluid conveyance through the pump, the fluid does not undergoes compression prior to port 65A. Pump housing 66, has intake ports 69 and 69*a*, one for input of combined heat oscillation streams $I_a+I_b$ and a second for input of working stream $I_w$ to form a combined stream $I_{comb}$. Housing 61*a* also includes two outlet ports 69B and 69C: one non-valved and the other valved. The two ports effectively split into the isochorically mixed and heated fluid into two exit streams: $I_a+I_w$ and $I_b$. Stream $I_a+I_w$ is freely expelled through non-valved port 69B whereas $I_b$ undergoes compression as it is expelled through valved port 69C. Additional, in a certain embodiment, isochoric pump 61 includes a heating chamber 66" embedded within pump wall 61*a*, according to an embodiment. Heating chamber 66" has a chamber inlet port 65*a* in communication with pump cavity 78 and a chamber exit port 65*b* in communication with a post-heating pump cavity 79. Furthermore, pump wall 61*a* has an embedded pump heat exchangers 66 and 66' in thermal communication with heating chamber 66", according to an embodiment. Pump heat exchanger 66, receives heat from heat oscillation stream $I_a$ and exchanger 66' receives heat from heat hotter oscillation stream $I_b+I_c$. Both heats are transferred from heat exchangers 66 and 66' to a non-circulating static stream $I_s$ of mass $m_3$ permanently disposed in heating chamber 66". There, $I_s$ mixes with liquefied-vapor mixture of a combined stream $I_{comb}$ upon contact through heater inlet port 65A as vanes 64 rotate counter clockwise, for example. Pump heat exchanger 66' is fitted with an insulator element 77 to isolate heat received from heat oscillation stream $I_b$ to heat cooler oscillation streams $I_a$ thereby maximizing heat transfer to heat chamber 66".

The use of a non-circulating volume $I_s$ as the heat transfer agent advantageously prevents the cycling stream from superheating thereby ensuring that the inter-molecular forces of the liquid-vapor mixture within the P-H envelope can be exploited to facilitate condensation. Furthermore, expansion achieved through flash expansion within the isochoric chamber of the pump prior to heating advantageously negates the need for a prior expansion cooling through an expansion valve. The reduced expansion advantageously preservers additional expansion capacity for work extraction.

It should be appreciated that in another embodiment, both heating chamber 66" and heat exchangers 66' and 66 are implemented as external heat exchangers outside of pump wall 61*a* while maintaining thermal communication with combined stream $I_{comb}$ disposed in isochoric and isobaric pump chambers 78 and 79, respectively.

As noted, stream $I_a+I_w$ exists freely from non-valved exit port 69B. System 60 includes a splitter 71 operative to split stream $I_a+I_w$ into a working stream $I_w$ and heat oscillation stream $I_a$. System 60 has an expander or other work extraction device operative to expand working stream $I_w$ for work extraction. System 60 is configured to direct heat oscillation stream $I_a$ to heat exchanger 66 where heat is transferred to heating chamber 66" and cycle to stream combiner 68 where it combines with heat oscillation stream $I_b$.

As noted, stream $I_b$ exits pump 61 through valved exit port 69C where it is compressed. System 60 is operative to direct $I_b$ to heat exchanger 66' where heat is also transferred to heating chamber 66" and then cycle stream $I_b$ to stream combiner 68 where it combines with heat oscillation stream $I_a$ and feeds into isochoric pump cavity 78 at port 69 and again mix with $I_w$. As shown, prior to the heat transfer in heat exchanger 66', It merges with cycling $I_c$. Stream $I_c$ receives heat from an external source at heater 67 and then $I_b+I_c$ discharge the collective heat load in 66'. Afterwards stream $I_c$ splits from stream $I_b$ and recycles as driven by very low pressure pump (VLP) 67. In this manner external heat is advantageously supplied to system 60 in accordance with operation needs. It should be appreciated that all embodiments have the option of adding heat from an external source in accordance with operational needs.

Under certain circumstances $I_b$ has a heat content not conducive to system operation, system 60 is configurable to direct stream $I_b$ into a bypass loop where it is cooled by cooler 74 by discharging heat to the cooler surroundings as will be further discussed. Stream $I_b$ is then directed to heater 66' in accordance with valves 72 and 75.

Liquid accumulators 70 and vapor accumulators 70A and 70B are employed to facilitate startup or to overcome other operation complications by providing the necessary liquid and vapor pressures as is known in the art.

In yet another embodiment, two or more isochoric pumps are linked in series such that oscillation heat stream $I_a+I_w$ freely exiting from a first isochoric pump is fed into a second pump together with stream $I_b$ where the streams isochorically mix and heat through contact with a non-circulating stream $I_s$. After heating heat stream $I_b$ is compressed through a valved pump exit and directed to a pump heat exchanger disposed in the second pump where it heats non-circulating stream $I_{s2}$ stream and directed to again mix with stream $I_a+I_w$ within second pump. The second pump in the series splits a working stream that freely exits and is expanded through an expander or other work extraction device and directed to the first pump for isochoric mixing with a split off of stream $I_b$. In the first pump the two streams are isochorically mixed and heated upon contact with another non-circulating stream segment $I_{s1}$. Non-circulating stream segment $I_{s1}$ is heated by a stream split off from the working stream upon exiting from the second pump. The serial isochoric pump scheme and associated dual isochoric heating scheme advantageously yields higher efficiencies because of the greater mixing, heating, and compression capacities.

Figure 14:
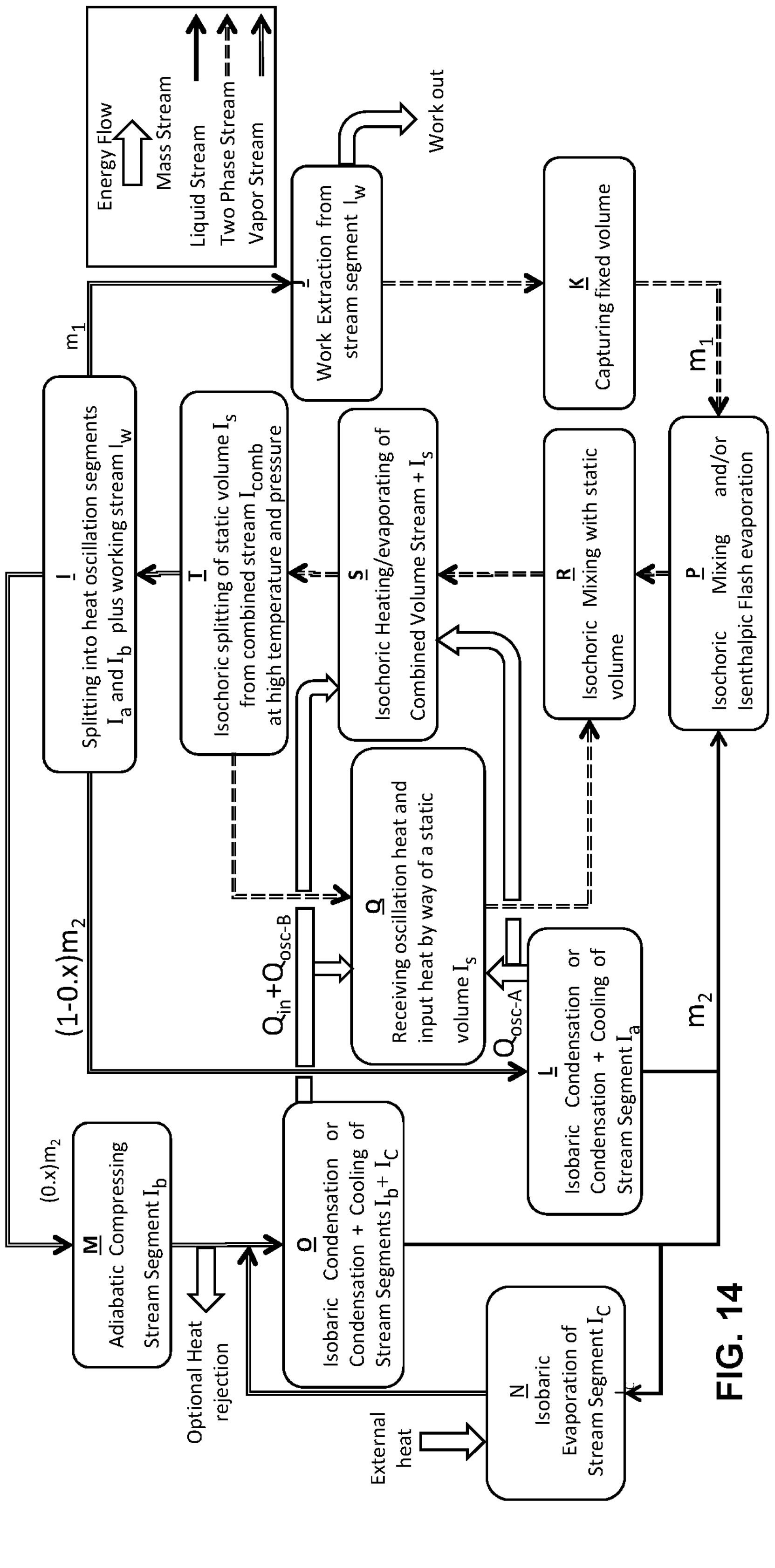
FIG. 14 is a flowchart of the processing steps employed by the linked heat oscillator and work extractor of FIG. 13.

FIG. 14 is a flow chart depicting the processing steps in view of P-H diagrams of FIGS. 12A and 12B and the system of FIG. 13, according to an embodiment.

For the purposes of this discussion, processing will be discussed at continuous mode and begin at pump output of two heat oscillation streams segments $I_a$ and $I_b$ at thermodynamic state 56 and 57 exiting from pump outlets 69B and valved port 69C in step I. The two heat oscillation streams segments $I_a$ and $I_b$ having a collective mass $m_2$ and their respective fractional masses are $(0.x)m_2$ for $I_b$ and $(1.0-0.x)m_2$ for $I_a$. Work extraction segment $I_w$ is split from oscillation stream segment $I_a$ are split as depicted at point 56 on the P-H diagram through splitter 71.

In step J, work is extracted from work extract segment $I_w$ through expander 63 or other work extraction device. Following the work extraction, in step K fixed volumes of stream segment $I_w$ are directed into isochoric pump 61 through port 69A. Concurrently, processing of heat oscillation stream segments $I_a$ and $I_b$ proceeds as follows.

In step L, stream segment $I_a$ is isobarically condensed, to state 51 through pump heat exchanger 66 where it releases condensation heat $Q_{osc-A}$ used to heat working fluid disposed in pump heating chamber 66".

In step M, heat oscillation stream segment $I_b$ is adiabatically compressed to state 57 by vanes 64 driving working fluid through valve 69C thereby raising the stream temperature to facilitate transfer of condensation heat when released in heat exchanger 66'. In situations in which stream segment $I_b$ contains excess heat or situations in which heat must be rejected for proper system functionality, exit valve 69C is adjusted to further compress segment $I_b$ upon exit from pump 61 to raise the stream temperature so that it exceeds the ambient temperature. Then segment $I_b$ is directed to a bypass loop in which heat $Q_{out}$ is released to the cooler surroundings thereby bringing the stream segment $I_b$ to a state of 57' by cooler 74. As shown, flow directions is implemented through the valve configurations of valves 72 and 75. After rejection of the excess heat, stream segment $I_b$ proceeds to exchanger 66'. In step O, heat oscillation segment $I_b+I_c$ is isobarically condensed or condensed and cooled to state 51' at heat exchanger 66'. Stream segment $I_c$ as will be further discussed. The released condensation heat $Q_{osc-B}$ is used to isochorically heat combined stream segments as will be later discussed.

In step N, a self-contained cycling stream is isobarically evaporated $I_c$ from state 51' to state 57" using external heat $Q_{in}$ at evaporator 67. It should be noted that $I_c$ is depicted above $I_b$ for clarity purposes only and in reality states 57' and 57" are identical. Vaporized stream $I_c$ combines with stream segment $I_b$ and in step O an is isobarically condensed and cooled to state 51' at heat exchanger 66'. After condensation, $I_c$ is recycled to evaporator 67 through low pressure pump 76 whereas stream segment $I_b$ combines with previously isobarically condensed stream $I_a$.

In step P, a portion of the work stream $I_w$ previously split from the expanded work stream $I_w$ as shown at point 58 of the P-H diagram is combined with both heat oscillation streams $I_a+I_b$ as noted to form a combined stream $I_{comb}$. It should be appreciated that processes depicted with dotted or dashed lines in the P-H diagrams of FIGS. 12A and 12B depict near instantaneous processes occurring upon contact or splitting of streams. The combined heat oscillations streams of $m_2$ and works stream volumes of mass $m_1$ isochorically mix and/or isenthalpically mix, at point 52 in the P-H diagram, upon entry into the isochoric pump cavity 78. In step Q, a static stream $I_s$ of mass $m_3$ previously split from a combined stream in step T and permanently disposed in heating chamber 66", receives heat oscillation heats $Q_{osc-A}$ and $Q_{osc-B}$ plus input heat $Q_{in}$.

In step R, pump vane 64 rotates and brings combined stream $I_{comb}$ in contact with non-circulating, static volume $I_s$ having a mass $m_3$ disposed in pump heating chamber 66" through port 65A enabling isochoric mixing to state 53. In step S previously released condensation heats $Q_{osc-A}$ from stream $I_a$ and $Q_{osc-B}$ together with input heat $Q_{in}$ from stream $I_b+I_c$ isochorically heat and/or evaporate combined stream $I_{comb}$ and static volume $I_s$ to a first temperature and pressure. All oscillation heat and input heat are transferred to the combined stream $I_{comb}$ through mixing with the static volume $I_s$ disposed in heating chamber 66".

In step T, non-circulating static stream $I_s$ of mass $m_3$ is split from combined stream $I_{comb}$ as noted above and depicted at point 54 of the P-H diagram. Vane 64 conveys the stream into heating chamber volume 66".

Variant Embodiments and Applications

The noted embodiments of the oscillating heat-management system and thermally oscillating work-extractor are configurable to operate in accordance with variant embodiments and applications In a certain variant embodiment of the thermally oscillating work-extractor, additional heat or work is input to complete the isochoric heating to the original high temperature and pressure.

One variant embodiment of the thermally oscillating work-extractor employs a working fluid mixed with an inert gas. After condensation of the non-inert fraction of the mixture in an isochoric heater pump, the inert gas from the condensate passes through a separator and is used to drive an expander. The condensate undergoes expansion cooling into liquid vapor mixture and is isochorically heated as described above.

A certain variant of the thermally oscillating work-extractor employs an expander to expansion cool condensate instead of an expansion valve to advantageously derive work from the oscillation cycle with the expanded inert gas in addition to a linked working cycle as describe above.

In a certain variant embodiment of the thermally oscillating work-extractor, the combined stream is split into a condensation steam of the oscillation cycle and a work cycle superheated from external heat source and heat recovered through a recuperator from heat ejection source having a temperature greater than the temperature of the combined stream at its hottest temperature.

A certain embodiment of the oscillator-engine system is implemented as a serial arrangement of isochoric heater pumps operative to isochorically vaporize a combined oscillation-work stream in progressive stages with condensation heat released from serial condensations.

Specifically, a combined oscillation-work stream having a first quality is isochorically heated with a heat released from a first condensation and then isobarically cooled to a second quality greater than the first quality and isochorically reheated with condensation heat released in another condensation. The isobaric cooling to a higher quality and subsequent isochoric heating is repeated in accordance with the number of heater pumps in the serial arrangement. External heat is added to complete the isochoric heating to a desired temperature and pressure. The combined oscillation-work stream is then split into a work fraction for work extraction and a fraction for condensation within the oscillation cycle. It should be appreciated that any of the three isochoric heater pumps described above can be employed in a serial arrangement.

Another variant embodiment of the serial heater pump arrangement employs a plurality of mixing stages of expansion-cooled condensate and post work-expansion working fluid to form a plurality of combined oscillation-work streams. Each of the combined oscillation-work streams are isochorically vaporized from heat released in single condensation.

Specifically, after a first mixing, the resulting first oscillation-work stream having a first quality is isochorically vaporized from a portion of the condensation heat released in a single condensation. The first oscillation-work stream is isobarically cooled and mixed with expansion-cooled condensate to form a second oscillation-work stream. The resulting second oscillation-work stream is also isochorically vaporized from the portion of the condensation heat released in the single condensation. External heat is added to complete the isochoric heating to a desired temperature and pressure. The combined oscillation-work stream is then split into a work fraction for work extraction and a fraction for condensation within the oscillation cycle. It should be appreciated that any of the three isochoric heater pumps described above can be employed in a serial arrangement, as noted above.

In certain cooling applications, the oscillating heat-management system provides air conditioning, refrigeration, or freezing to a cooling space from which heat is conveyed away and used to supplement condensation heat in isobaric and/or isochoric heating in an isobaric heat exchanger and/or an isochoric heater pump of the expansion-cooled condensate in the oscillation cycle.

In certain heating applications, the oscillating heat-management system is thermally linked to a boiler of a desalination or distillation unit. The condensation heat released during the oscillation cycle drives desalination or distillation and condensation heat released in the production of distillate is redirected to the isochoric heater pump for isochoric heating in the oscillator cycle.

In heat transfer applications, the oscillating heat-management system is operative to provide both the above described heating and cooling functionality through linkage to a cooling device and boiler as noted.

In another application, the oscillating heat-management system is linked to either an external heat engine or integrally linked with a work extraction device as described above to provide work in addition to cooling and/or heating.

It should be appreciated that all the noted embodiments suffer from heat losses. These heat losses have not been depicted for the sake of clarity. Similarly, provisions for ejecting extra heat for ejecting excess are included in all embodiments. Certain embodiments do not depict these provisions also for the sake of clarity. Furthermore, control equipment used in startup and troubleshooting procedures are included in all embodiments and in some embodiments they are not depicted also for the sake of clarity.

While certain features of the invention have been illustrated and described herein, modifications, substitutions, changes, and equivalents are included within the scope of the invention as known to those of ordinary skill in the art. It is, therefore, to be understood that the appended claims are intended to cover all such modifications and changes as fall within the true spirit of the invention.

The invention claimed is:

1. A method of heat management within a cycling liquid-vapor stream, the method comprising:

isobarically releasing condensation heat from vapor of a fraction of the cycling liquid-vapor stream so as to produce condensate at a first temperature and a first pressure;

concurrently cooling condensate of the liquid-vapor stream into a condensate, forming a cooled condensate having a second temperature less than the first temperature and a second pressure less than the first pressure, the cooling implemented as adiabatic cooling or isenthalpic cooling; and isochorically vaporizing the cooled condensate with the condensation heat and/or an external heat.

2. The method of claim 1, wherein the cooling is implemented as expansion cooling, thereby forming an expansion-cooled condensate.

3. The method of claim 1, further comprising driving an external heat engine with the condensation heat and using the condensate as a heat sink for the external heat engine.

4. The method of claim 2, further comprising heating a boiler of a distillation unit with the condensation heat and isochorically heating the expansion-cooled condensate with heat generated in condensation forming a distillate.

5. The method of claim 2, further comprising receiving external heat in the expansion-cooled condensate from a cooling space or from an ambient environment, the external heat supplementing vaporization of the expansion-cooled condensate.

6. The method of claim 1, further comprising ejecting a portion of the condensation heat to a heating space or an ambient environment.

7. The method of claim 1, further comprising extracting work from a portion of a combined oscillation-work stream.

8. The method of claim 1, wherein the cooling condensate is implemented as flash expansion into an isochoric pump.

9. The method of claim 8, wherein the isochorically vaporizing is implemented in the isochoric pump.

10. The method of claim 8, wherein the heat is the condensation heat captured in one or more non-circulating stream segments of the cycling liquid-vapor stream.

11. The method of claim 8, wherein the heat includes heat captured from an external heat source.

12. A thermal oscillator for managing heat content within a cycling liquid-vapor stream, the oscillator comprising:

a condenser having a plurality of isobaric, heat-conductive cooling channels operative to release condensation heat from a vapor component of the cycling liquid-vapor fluid stream so as to form condensate at a first temperature and a first pressure;

a condensate expansion arrangement configured to adiabatically or isenthapically cool the condensate to a second temperature less than the first temperature and a second pressure less than the first pressure, forming a cooled condensate; and an isochoric heater pump comprising:

a plurality of constant-volume heating chambers heated by the condensation heat and/or an external heat;

at least one intake port to form at least one combined stream from an oscillation stream comprising the cooled condensate and at least one expanded input stream; and at least one outlet port configured to split the combined stream into a first oscillation stream and at least one second stream segment;

wherein the heater pump vaporizes the cooled condensate into vapor during conveyance within the pump and wherein the split first oscillation stream undergoes condensation.

13. The thermal oscillator of claim 12, wherein the condensate expansion arrangement is implemented as an expansion valve.

14. The thermal oscillator of claim 12, wherein the isochoric heater pump includes a twin-screw drive of counter-rotating interleaved screws.

15. The thermal oscillator of claim 12, wherein the condensate expansion arrangement is implemented as the isochoric heater pump.

16. The thermal oscillator of claim 12, further comprising a work extraction device in thermal communication with the isochoric heater pump.

17. The thermal oscillator of claim 12, wherein the heating chambers are heated by an external heat and wherein the heater pump is implemented as an isochoric pump in thermal communication with an external heat exchanger configured to provide the external heat.

18. The thermal oscillator of claim 12, thermally linked to a boiler of a distillation unit, heated by the condensation heat and isochorically heating the expansion-cooled condensate with heat released in the production of a distillate.

19. The thermal oscillator of claim 12, wherein the heater pump heat receives condensation heat from one or more non-circulating stream segments of the cycling liquid-vapor fluid stream.

20. A method of heat management within a cycling liquid-vapor stream, the method comprising:

releasing condensation heat isobarically from vapor of a first stream segment of the cycling liquid-vapor stream thereby producing condensate at a first temperature and a first pressure;

expanding a second stream segment of the cycling liquid-vapor stream thereby producing an expanded liquid-vapor stream;

combining the expanded liquid-vapor stream isochorically with the condensate thereby producing a combined liquid-vapor stream;

and vaporizing the combined liquid-vapor stream isochorically with the condensation heat and/or an external heat.

21. The method of claim 20, further comprising expanding a stream segment of the condensate thereby producing a cooled condensate at a second temperature less than the first temperature and a second pressure less than the first pressure.

22. The method of claim 19 further comprising flash evaporation of a liquid portion of the combined liquid-vapor stream.

* * * * *